United States Patent
Xu et al.

(10) Patent No.: US 10,212,681 B2
(45) Date of Patent: Feb. 19, 2019

(54) CHANNEL BOUNDARY LOCATING METHOD, BASE STATION, AND USER EQUIPMENT

(71) Applicant: Huawei Technologies Co., Ltd., Shenzhen (CN)

(72) Inventors: Wenying Xu, Shenzhen (CN); Xueli Ma, Shenzhen (CN); Jun Chen, Shanghai (CN); Xiaoxiao Zheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 15/344,225

(22) Filed: Nov. 4, 2016

(65) Prior Publication Data

US 2017/0078992 A1    Mar. 16, 2017

Related U.S. Application Data

(63) Continuation of application No. PCT/CN2014/076904, filed on May 6, 2014.

(51) Int. Cl.
*H04W 56/00* (2009.01)
*H04W 24/02* (2009.01)
(Continued)

(52) U.S. Cl.
CPC ......... *H04W 56/003* (2013.01); *H04W 24/02* (2013.01); *H04W 56/0015* (2013.01);
(Continued)

(58) Field of Classification Search
CPC .......... H04W 56/003; H04W 56/0015; H04W 24/02; H04W 74/006; H04W 76/28;
(Continued)

(56) References Cited

U.S. PATENT DOCUMENTS

| 2009/0296643 | A1* | 12/2009 | Cave ..................... H04L 1/1812 |
|---|---|---|---|
| | | | 370/329 |
| 2014/0036883 | A1* | 2/2014 | Chen ..................... H04L 5/0078 |
| | | | 370/336 |

(Continued)

FOREIGN PATENT DOCUMENTS

| CN | 102984794 A | 3/2013 |
|---|---|---|
| CN | 103391526 A | 11/2013 |

(Continued)

OTHER PUBLICATIONS

"3$^{rd}$ Generation Partnership Project; Technical Specification Group Radio Access Network; Physical channels and mapping of transport channels onto physical channels (FDD) (Release 11)," 3GPP TS 25.211, V11.4.0, pp. 1-63, 3$^{rd}$ Generation Partnership Project, Valbonne, France (Jun. 2013).

(Continued)

*Primary Examiner* — Raj Jain
*Assistant Examiner* — Harry H Kim
(74) *Attorney, Agent, or Firm* — Leydig, Voit & Mayer, Ltd.

(57) ABSTRACT

Embodiments of the present invention provide a channel boundary locating method, a base station, and a user equipment. The method includes: receiving, by a base station of non-time reference cell, cell timing information delivered by a network, where the cell timing information includes a non-time reference parameter, and the non-time reference parameter corresponds to a smallest timing difference between a downlink F-DPCH frame of time reference cell and an HS-PDSCH subframe of time reference cell; calculating, by the base station of non-time reference cell, boundary information of a high speed shared control channel (HS-SCCH) according to the non-time reference parameter; and acquiring boundary information of a high speed dedicated physical control channel (HS-DPCCH) of non-time (Continued)

reference cell according to the boundary information of the HS-SCCH. In the embodiments of the present invention, reliability of downlink data transmission is improved.

14 Claims, 7 Drawing Sheets

(51) Int. Cl.
*H04W 74/00* (2009.01)
*H04W 76/28* (2018.01)
*H04L 1/18* (2006.01)
*H04W 88/02* (2009.01)
*H04W 88/08* (2009.01)

(52) U.S. Cl.
CPC ......... *H04W 74/006* (2013.01); *H04L 1/1812* (2013.01); *H04W 76/28* (2018.02); *H04W 88/02* (2013.01); *H04W 88/08* (2013.01)

(58) Field of Classification Search
CPC ... H04W 88/08; H04W 88/02; H04W 76/048; H04L 1/1812
See application file for complete search history.

(56) References Cited

U.S. PATENT DOCUMENTS

| | | | |
|---|---|---|---|
| 2014/0219259 A1 | 8/2014 | Lin et al. | |
| 2015/0063344 A1 | 3/2015 | Chen et al. | |
| 2015/0280889 A1* | 10/2015 | Wang | H04W 56/00 370/336 |
| 2017/0048779 A1 | 2/2017 | Pani et al. | |

FOREIGN PATENT DOCUMENTS

| | | |
|---|---|---|
| EP | 2713663 A1 | 4/2014 |
| EP | 2840843 A1 | 2/2015 |
| RU | 2467513 C2 | 11/2012 |
| WO | 2013166872 A1 | 11/2013 |
| WO | WO 2014019174 A1 | 2/2014 |

OTHER PUBLICATIONS

"3$^{rd}$ Generation Partnership Project; Technical Specification Group Radio Access Network; Physical layer procedures (FDD) (Release 11)," 3GPP TS 25.214, V11.8.0, pp. 1-128, 3$^{rd}$ Generation Partnership Project, Valbonne, France (Mar. 2014).
"3$^{rd}$ Generation Partnership Project; Technical Specification Group Radio Access Network; UTRAN lub interface Node B Application Part (NBAP) signalling (Release 12)," 3GPP TS 25.433, V12.0.0, pp. 1-1348, 3$^{rd}$ Generation Partnership Project, Valbonne, France (Dec. 2013).
"Remaining issues of MF-Tx," 3GPP TSG-RAN WG1 Meeting #70, Qingdao, China, R1-123821, 3$^{rd}$ Generation Partnership Project, Valbonne, France (Aug. 13-17, 2012).
"HS-DPCCH timing in non-time reference cell when multiflow is configured," 3GPP TSG-RAN WG1 Meeting #72, St. Julian's, Malta, R1-130505, 3$^{rd}$ Generation Partnership Project, Valbonne, France (Jan. 28-Feb. 1, 2013).
"Correction to timing in non-time reference cell when multiflow is configured," Change Request, 3GPP TSG-RAN1 Meeting #72, St. Julian's, Malta, R1-130506, 3$^{rd}$ Generation Partnership Project, Valbonne, France (Jan. 28-Feb. 1, 2013).
"Response to R1-130505/0506; Multiflow HS-DPCCH timing in the non-time reference cell," 3GPP TSG RAN WG1 Meeting #72, St. Julian's, Malta, R1-130720, 3$^{rd}$ Generation Partnership Project, Valbonne, France (Jan. 28-Feb. 1, 2013).
"Universal Mobile Telecommunications System (UMTS); Physical channels and mapping of transport channels onto physical channels (FDD) (3GPP TS 25.211, version 11.4.0 Release 11)," ETSI TS 125 211, V11.4.0, pp. 1-64, 3$^{rd}$ Generation Partnership Project, Valbonne, France (Jul. 2013).
Universal Mobile Telecommunications System (UMTS); Physical layer procedures (FDD) (3GPP TS 25.214 version 11.8.0 Release 11), ETSI TS 125 214 V11.8.0, pp. 1-129, 3$^{rd}$ Generation Partnership Project, Valbonne, France (Mar. 2014).

\* cited by examiner

CHANNEL BOUNDARY LOCATING METHOD, BASE STATION, AND USER EQUIPMENT

CROSS-REFERENCE TO RELATED APPLICATIONS

This application is a continuation of International Application No. PCT/CN2014/076904, filed on May 6, 2014, the disclosure of which is hereby incorporated by reference in its entirety.

TECHNICAL FIELD

Embodiments of the present invention relate to the field of communications technologies, and in particular, to a channel boundary locating method, a base station, and a user equipment.

BACKGROUND

When a universal mobile telecommunications system (UMTS) technology evolves to Release Rel-11, a multiflow transmission (Multiflow) feature is introduced. This feature allows a plurality of intra-frequency or inter-frequency cells to be configured as high-speed downlink shared channel (HS-DSCH) serving cells of a user equipment (UE), which obviously improves user experience. In UMTS Rel-7, a downlink discontinuous reception (DRX) feature is introduced, which can allow a UE to receive downlink data in a discontinuous manner, thereby reducing power consumption of the UE. In a case of the Multiflow, there may be certain timing differences between downlink common channels of a plurality of intra-frequency HS-DSCH serving cells, which are mainly caused by base station clock timing corresponding to the cells, timing offsets (Tcell) of the cells, and timing differences (Tp) introduced by air interface transmission.

A timing relationship between HS-DSCH serving cells may specifically include a high speed shared control channel (HS-SCCH), a high speed physical downlink shared channel (HS-PDSCH), a high speed dedicated physical control channel (HS-DPCCH), and a fractional dedicated physical channel (F-DPCH), where the HS-PDSCH is a channel for indicating HSDPA data transmission; the HS-SCCH carries data indication information, for example, an identifier for scheduling a UE; the HS-PDSCH carries specific data information; the HS-DPCCH carries feedback indication information for downlink data, for example, a channel condition indication and data reception feedback indication information; and the F-DPCH channel is a dedicated channel, and is used for performing power control on a dedicated channel and performing control on data transmit power of an uplink channel of a UE. These channels have fixed timing relationships. Seen from the perspective of a cell side, it is necessary to find a start point of the HS-DPCCH to receive uplink data; according to protocol specifications, a cell needs to find backwards, according to an HS-SCCH start point, an HS-DPCCH boundary that is closest to 1280 chips as a boundary.

Using a single frequency dual cell (SF-DC) feature as an example, in a case of the SF-DC feature, there are two serving cells. There is a certain timing difference of cells between downlink common channels within the cells, and the two cells may belong to a same base station or different base stations. In the case of the SF-DC, a UE needs to receive data in two cells in the downlink direction, but only needs to perform sending in one cell, and the other cell also needs to demodulate data (in an inter-base station SF-DC scenario). This requires a UE side to specify a matching relationship between subframes for receiving downlink data. The two cells of the UE may be separately defined as a time reference cell and a non-time reference cell, where timing of channels between the time reference cell and the UE is same as channel timing specified in Rel-5 HSDPA, and the other cell is the non-time reference cell. For example, HS-SCCH S_DRX=0 in the time reference cell of the UE is matched with HS-SCCH S_DRX=0 in the non-time reference cell; then, after the UE receives data of the two subframes, the UE performs, in the time reference cell, feedback on the HS-DPCCH according to an existing timing rule, where there is a fixed timing relationship between the HS-DPCCH and the HS-SCCH. For the non-time reference cell, a boundary of the HS-DPCCH is also searched for according to a protocol. However, because of the timing difference between the downlink common channels of the cells, an error may occur when the UE or the non-time reference cell searches for the boundary of the HS-DPCCH. Because the UE side receives HS-SCCH S_DRX=0 of the two cells at the same time and performs feedback through one HS-DPCCH, the UE or the non-time reference cell may incorrectly locate an HS-DPCCH boundary, which eventually affects downlink data transmission performance.

SUMMARY

Embodiments of the present invention provide a channel boundary locating method, a base station, and a user equipment, so as to address a problem in the prior art that a non-time reference cell incorrectly locates an HS-DPCCH boundary, which eventually affects performance of downlink data transmission.

According to a first aspect, an embodiment of the present invention provides a channel boundary locating method, including:
  receiving, by a base station of non-time reference cell, cell timing information delivered by a network, where the cell timing information includes a non-time reference parameter, and the non-time reference parameter corresponds to a smallest timing difference between a downlink F-DPCH frame of time reference cell and an HS-PDSCH subframe of time reference cell;
  calculating, by the base station of non-time reference cell, boundary information HS-SCCH CFN_DRX n of a high speed shared control channel (HS-SCCH) according to the non-time reference parameter; and
  acquiring, by the base station of non-time reference cell, boundary information of a high speed dedicated physical control channel (HS-DPCCH) according to the boundary information of the HS-SCCH.

With reference to the first aspect, in a first implementation manner of the first aspect, the calculating boundary information HS-SCCH CFN_DRX n of a high speed shared control channel (HS-SCCH) according to the non-time reference parameter includes:
  aligning a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets $-3840 \text{chips} \leq \tau_{DRX} - T_0 - 7680 * \text{DRX\_OFFSET} < 3840$ chips, and $T_0$ is 1024 chips, where
  CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

$T_{TX\_diff2}$ is equal to a smallest timing difference between a downlink F-DPCH frame of non-time reference cell and an HS-PDSCH subframe of non-time reference cell; and $T_{TX\_diff1}$ is equal to the Non-time Reference.

With reference to the first aspect, in a second implementation manner of the first aspect, the calculating boundary information HS-SCCH CFN_DRX n of a high speed shared control channel (HS-SCCH) according to the non-time reference parameter includes:

aligning a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets $-3840\text{chips} \leq \tau_{DRX} - T_0 - 7680 \ast DRX\_OFFSET < 3840$ chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

$T_{TX\_diff1}$ is equal to the Non-time Reference; and if $T_{TX\_diff3}$ is less than 7680×1.5, less than 7680×2, or less than 7680×2.5, $T_{TX\_diff2}$ is equal to $T_{TX\_diff3}$; and if $T_{TX\_diff3}$ is greater than or equal to 7680×1.5, greater than or equal to 7680×2, or greater than or equal to 7680×2.5, $T_{TX\_diff2}$ is equal to $T_{TX\_diff3}$−38400, where $T_{TX\_diff3}$ is equal to a timing difference between a downlink F-DPCH frame of non-time reference cell and an HS-PDSCH subframe of non-time reference cell, and a hybrid automatic retransmission request acknowledgement (HARQ-ACK) field corresponding to the HS-PDSCH subframe corresponding to $T_{TX\_diff3}$ and a hybrid automatic retransmission request acknowledgement (HARQ-ACK) field corresponding to the HS-PDSCH subframe corresponding to the Non-time Reference are in a same HS-DPCCH subframe.

With reference to the first aspect, in a third implementation manner of the first aspect, the calculating boundary information HS-SCCH CFN_DRX n of a high speed shared control channel (HS-SCCH) according to the non-time reference parameter includes:

aligning a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets $-3840\text{chips} \leq \tau_{DRX} - T_0 - 7680 \ast DRX\_OFFSET < 3840$ chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

and if $T_{TX\_diff3}$ is less than 7680×1.5, less than 7680×2, or less than 7680×2.5, $T_{TX\_diff2}$ is equal to $T_{TX\_diff3}$, and $T_{TX\_diff1}$ is equal to the Non-time Reference; and if $T_{TX\_diff3}$ is greater than or equal to 7680×1.5, greater than or equal to 7680×2, or greater than or equal to 7680×2.5, $T_{TX\_diff2}$ is equal to a smallest timing difference between a downlink F-DPCH frame of non-time reference cell and an HS-PDSCH subframe of non-time reference cell, and $T_{TX\_diff1}$ is equal to the Non-time Reference plus 7680, where $T_{TX\_diff3}$ is a timing difference between the downlink F-DPCH frame of non-time reference cell and the HS-PDSCH subframe of non-time reference cell, and a hybrid automatic retransmission request acknowledgement (HARQ-ACK) field corresponding to the HS-PDSCH subframe corresponding to $T_{TX\_diff3}$ and a hybrid automatic retransmission request acknowledgement (HARQ-ACK) field corresponding to the HS-PDSCH subframe corresponding to the Non-time Reference are in a same HS-DPCCH subframe.

With reference to any one of the first to third implementation manners of the first aspect, in a fourth implementation manner of the first aspect, the acquiring the boundary information of the HS-DPCCH according to the boundary information of the HS-SCCH includes:

when a UE is not configured in multiple-input multiple-output mode, or when the UE is configured in multiple-input multiple-output mode and the UE indicates not requiring a longer HARQ processing time, determining boundary information of an HS-DPCCH subframe that is closest in time to $1280-|T_{TX\_diff2}-T_{TX\_diff1}|$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to any one of the first to third implementation manners of the first aspect, in a fifth implementation manner of the first aspect, the acquiring the boundary information of the HS-DPCCH according to the boundary information of the HS-SCCH includes:

when a UE is configured in multiple-input multiple-output mode and the UE indicates requiring a longer HARQ processing time, determining boundary information of an HS-DPCCH subframe that is closest in time to $1280+|T_{TX\_diff2}-T_{TX\_diff1}|$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to any one of the first to third implementation manners of the first aspect, in a sixth implementation manner of the first aspect, the acquiring the boundary information of the HS-DPCCH according to the boundary information of the HS-SCCH includes:

determining boundary information of an HS-DPCCH subframe that is closest in time to $1280+T_{TX\_diff1}-T_{TX\_diff2}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

According to a second aspect, an embodiment of the present invention provides a channel boundary locating method, including:

calculating, by a base station of non-time reference cell, boundary information HS-SCCH CFN_DRX n of a high speed shared control channel (HS-SCCH) according to a timing difference $T_{TX\_diff}$ between a downlink F-DPCH frame of non-time reference cell and an HS-PDSCH subframe of non-time reference cell and a timing difference $\tau_{DIFF}$ between an HS-PDSCH subframe of time reference cell and the HS-PDSCH subframe of non-time reference cell; and acquiring, by the base station of non-time reference cell, boundary information of a high speed dedicated physical control channel (HS-DPCCH) according to the boundary information of the HS-SCCH.

With reference to the second aspect, in a first implementation manner of the second aspect, the calculating boundary information HS-SCCH CFN_DRX n of a high speed shared control channel (HS-SCCH) according to a timing difference $T_{TX\_diff}$ between a downlink F-DPCH frame of non-time reference cell and an HS-PDSCH subframe of non-time reference cell and a timing difference $\tau_{DIFF}$ between an HS-PDSCH subframe of time reference cell and the HS-PDSCH subframe of non-time reference cell includes:

aligning a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets $-3840\text{chips}\leq\tau_{DRX}-T_0-7680*\text{DRX\_OFFSET}<3840$ chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where when a user equipment (UE) is not configured in multiple-input multiple-output mode, or when the UE is configured in multiple-input multiple-output mode and the UE indicates not requiring a longer HARQ processing time, DRX_OFFSET is $$\left\lfloor \frac{\frac{T_{TX\_diff}}{2560}-0.9}{3} \right\rfloor - \left\lfloor \left\lfloor \frac{\frac{T_{TX\_diff}-\tau_{DIFF}}{2560}-0.9}{3} \right\rfloor \right\rfloor,$$

$$\left\lfloor \frac{\frac{T_{TX\_diff}}{2560}-0.9}{3} \right\rfloor - \left\lfloor \frac{\frac{T_{TX\_diff}-\lfloor\frac{\tau_{DIFF}}{256}\rfloor\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}-\lceil\frac{\tau_{DIFF}}{256}\rceil\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}-\text{round}(\frac{\tau_{DIFF}}{256})\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{\lfloor T_{TX\_diff}-\frac{\tau_{DIFF}}{256}\rfloor\times 256}{2560}-0.9}{3} \right\rfloor,$$

or $\left\lfloor \frac{\frac{T_{TX\_diff}}{2560}-0.9}{3} \right\rfloor - \left\lfloor \frac{\frac{\lceil T_{TX\_diff}-\frac{\tau_{DIFF}}{256}\rceil\times 256}{2560}-0.9}{3} \right\rfloor.$ or when a user equipment (UE) is configured in multiple-input multiple-output mode and the UE indicates requiring a longer HARQ processing time, DRX_OFFSET is $$\left\lfloor \frac{\frac{T_{TX\_diff}}{2560}-0.9}{3} \right\rfloor - \left\lfloor \left\lfloor \frac{\frac{T_{TX\_diff}+\tau_{DIFF}}{2560}-0.9}{3} \right\rfloor \right\rfloor,$$

$$\left\lfloor \frac{\frac{T_{TX\_diff}}{2560}-0.9}{3} \right\rfloor - \left\lfloor \frac{\frac{T_{TX\_diff}+\lfloor\frac{\tau_{DIFF}}{256}\rfloor\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}+\lceil\frac{\tau_{DIFF}}{256}\rceil\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}+\text{round}(\frac{\tau_{DIFF}}{256})\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{\lfloor T_{TX\_diff}+\frac{\tau_{DIFF}}{256}\rfloor\times 256}{2560}-0.9}{3} \right\rfloor,$$

or $\left\lfloor \frac{\frac{T_{TX\_diff}}{2560}-0.9}{3} \right\rfloor - \left\lfloor \frac{\frac{\lceil T_{TX\_diff}+\frac{\tau_{DIFF}}{256}\rceil\times 256}{2560}-0.9}{3} \right\rfloor.$ With reference to the second aspect or the first implementation manner of the second aspect, in a second implementation manner of the second aspect, the acquiring the boundary information of the HS-DPCCH according to the boundary information of the HS-SCCH includes:

when the UE is not configured in multiple-input multiple-output mode, or when the UE is configured in multiple-input multiple-output mode and the UE indicates not requiring a longer HARQ processing time, determining boundary information of an HS-DPCCH subframe that is closest in time to 1280−$\tau_{DIFF}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to the second aspect or the first implementation manner of the second aspect, in a third implementation manner of the second aspect, the acquiring the boundary information of the HS-DPCCH according to the boundary information of the HS-SCCH includes:

when the UE is configured in multiple-input multiple-output mode and the UE indicates requiring a longer HARQ processing time, determining boundary information of an HS-DPCCH subframe that is closest in time to 1280+$\tau_{DIFF}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

According to a third aspect, an embodiment of the present invention provides a channel boundary locating method, including:

calculating, by a base station of non-time reference cell, boundary information HS-SCCH CFN_DRX n of a high speed shared control channel (HS-SCCH) according to a timing difference $T_{TX\_diff,B}$ between a downlink F-DPCH frame of non-time reference cell and an HS-PDSCH subframe of non-time reference cell and a timing difference $T_{TX\_diff,A}$ between a downlink F-DPCH frame of time reference cell and an HS-PDSCH subframe of time reference cell; and acquiring, by the base station of non-time reference cell, boundary information of a high speed dedicated physical control channel (HS-DPCCH) according to the boundary information of the HS-SCCH.

With reference to the third aspect, in a first implementation manner of the third aspect, the calculating boundary information HS-SCCH CFN_DRX n of a high speed shared control channel (HS-SCCH) according to a timing difference $T_{TX\_diff,B}$ between a downlink F-DPCH frame of non-time reference cell and an HS-PDSCH subframe of non-time reference cell and a timing difference $T_{TX\_diff,A}$ between a downlink F-DPCH frame of time reference cell and an HS-PDSCH subframe of time reference cell includes:

aligning a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets −3840chips≤$\tau_{DRX}$−$T_0$−7680*DRX_OFFSET <3840 chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where DRX_OFFSET is $$\left\lfloor \frac{\frac{T_{TX\_diff,B}}{2560}-0.9}{3} \right\rfloor - \left\lfloor \frac{\frac{T_{TX\_diff,A}}{2560}-0.9}{3} \right\rfloor;$$

a hybrid automatic retransmission request acknowledgement (HARQ-ACK) field corresponding to the HS-PDSCH subframe corresponding to $T_{TX\_diff,B}$ and a hybrid automatic retransmission request acknowledgement (HARQ-ACK) field corresponding to the HS-PDSCH subframe corresponding to $T_{TX\_diff,A}$ are in a same HS-DPCCH subframe; and |$T_{TX\_diff,B}$−$T_{TX\_diff,A}$|<7680 or |$T_{TX\_diff,B}$−$T_{TX\_diff,A}$|≤3840.

With reference to the third aspect or the first implementation manner of the third aspect, in a second implementation manner of the third aspect, the acquiring the boundary information of the HS-DPCCH according to the boundary information of the HS-SCCH includes:

when a user equipment (UE) is not configured in multiple-input multiple-output mode, or when the UE is configured in multiple-input multiple-output mode and the UE indicates not requiring a longer HARQ processing time, determining boundary information of an HS-DPCCH subframe that is closest in time to 1280−|$T_{TX\_diff,B}$−$T_{TX\_diff,A}$| chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to the third aspect or the first implementation manner of the third aspect, in a third implementation manner of the third aspect, the acquiring the boundary information of the HS-DPCCH according to the boundary information of the HS-SCCH includes:

when a user equipment (UE) is configured in multiple-input multiple-output mode and the UE indicates requiring a longer HARQ processing time, determining boundary information of an HS-DPCCH subframe that is closest in time to 1280+|$T_{TX\_diff,B}$−$T_{TX\_diff,A}$| chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to the third aspect or the first implementation manner of the third aspect, in a fourth implementation manner of the third aspect, the acquiring the boundary information of the HS-DPCCH according to the boundary information of the HS-SCCH includes:

determining boundary information of an HS-DPCCH subframe that is closest in time to 1280+$T_{TX\_diff,A}$−$T_{TX\_diff,B}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

According to a fourth aspect, an embodiment of the present invention provides a channel boundary locating method, including:

calculating, by a user equipment (UE), boundary information HS-SCCH CFN_DRX n of a high speed shared control channel (HS-SCCH) according to a smallest timing difference between a downlink F-DPCH frame of time reference cell and an HS-PDSCH subframe of time reference cell; and acquiring, by the UE, boundary information of a high speed dedicated physical control channel (HS-DPCCH) according to the boundary information of the HS-SCCH.

With reference to the fourth aspect, in a first implementation manner of the fourth aspect, the calculating boundary information HS-SCCH CFN_DRX n of a high speed shared control channel (HS-SCCH) according to a smallest timing difference between a downlink F-DPCH frame of time reference cell and an HS-PDSCH subframe of time reference cell includes:

aligning a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets $-3840\text{chips} \leq \tau_{DRX} - T_0 - 7680*\text{DRX\_OFFSET} < 3840$ chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

$T_{TX\_diff2}$ is equal to a smallest timing difference between a downlink F-DPCH frame of non-time reference cell and an HS-PDSCH subframe of non-time reference cell; and $T_{TX\_diff1}$ is equal to the smallest timing difference between the downlink F-DPCH frame of time reference cell and the HS-PDSCH subframe of time reference cell.

With reference to the fourth aspect, in a second implementation manner of the fourth aspect, the calculating boundary information HS-SCCH CFN_DRX n of a high speed shared control channel (HS-SCCH) according to a smallest timing difference between a downlink F-DPCH frame of time reference cell and an HS-PDSCH subframe of time reference cell includes:

aligning a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets $-3840\text{chips} \leq \tau_{DRX} - T_0 - 7680*\text{DRX\_OFFSET} < 3840$ chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

$T_{TX\_diff1}$ is equal to the smallest timing difference between the downlink F-DPCH frame of time reference cell and the HS-PDSCH subframe of time reference cell; and if $T_{TX\_diff3}$ is less than 7680×1.5, less than 7680×2, or less than 7680×2.5, $T_{TX\_diff2}$ is equal to $T_{TX\_diff3}$; and if $T_{TX\_diff3}$ is greater than or equal to 7680×1.5, greater than or equal to 7680×2, or greater than or equal to 7680×2.5, $T_{TX\_diff2}$ is equal to $T_{TX\_diff3}-38400$, where $T_{TX\_diff3}$ is a timing difference between a downlink F-DPCH frame of non-time reference cell and an HS-PDSCH subframe of non-time reference cell, and a hybrid automatic retransmission request acknowledgement (HARQ-ACK) field corresponding to the HS-PDSCH subframe corresponding to $T_{TX\_diff3}$ and a hybrid automatic retransmission request acknowledgement (HARQ-ACK) field corresponding to the HS-PDSCH subframe corresponding to $T_{TX\_diff1}$ are in a same HS-DPCCH subframe.

With reference to the fourth aspect, in a third implementation manner of the fourth aspect, the calculating boundary information HS-SCCH CFN_DRX n of a high speed shared control channel (HS-SCCH) according to a smallest timing difference between a downlink F-DPCH frame of time reference cell and an HS-PDSCH subframe of time reference cell includes:

aligning a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets $-3840\text{chips} \leq \tau_{DRX} - T_0 - 7680*\text{DRX\_OFFSET} < 3840$ chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

and if $T_{TX\_diff3}$ is less than 7680×1.5, less than 7680×2, or less than 7680×2.5, $T_{TX\_diff2}$ is equal to $T_{TX\_diff3}$, and $T_{TX\_diff1}$ is equal to the smallest timing difference between the downlink F-DPCH frame of time reference cell and the HS-PDSCH subframe of time reference cell; and if $T_{TX\_diff3}$ is greater than or equal to 7680×1.5, greater than or equal to 7680×2, or greater than or equal to 7680×2.5, $T_{TX\_diff2}$ is equal to a smallest timing difference between a downlink F-DPCH frame of non-time reference cell and an HS-PDSCH subframe of non-time reference cell, and $T_{TX\_diff1}$ is equal to 7680 plus the smallest timing difference between the downlink F-DPCH frame of time reference cell and the HS-PDSCH subframe of time reference cell, where $T_{TX\_diff3}$ is a timing difference between the downlink F-DPCH frame of non-time reference cell and the HS-PDSCH subframe of non-time reference cell, and a hybrid automatic retransmission request acknowledgement (HARQ-ACK) field corresponding to the HS-PDSCH subframe corresponding to $T_{TX\_diff3}$ and a hybrid automatic retransmission request acknowledgement (HARQ-ACK) field corresponding to the HS-PDSCH subframe corresponding to the smallest timing difference between the downlink F-DPCH frame of time reference cell and the HS-PDSCH subframe of time reference cell are in a same HS-DPCCH subframe.

With reference to any one of the first to third implementation manners of the fourth aspect, in a fourth implementation manner of the fourth aspect, the acquiring the boundary information of the HS-DPCCH according to the boundary information of the HS-SCCH includes:

when the UE is not configured in multiple-input multiple-output mode, or when the UE is configured in multiple-input multiple-output mode and the UE indicates not requiring a longer HARQ processing time, determining boundary information of an HS-DPCCH subframe that is closest in time to $1280-|T_{TX\_diff2}-T_{TX\_diff1}|$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to any one of the first to third implementation manners of the fourth aspect, in a fifth implementation manner of the fourth aspect, the acquiring the boundary information of the HS-DPCCH according to the boundary information of the HS-SCCH includes:

when the UE is configured in multiple-input multiple-output mode and the UE indicates requiring a longer HARQ processing time, determining boundary information of an HS-DPCCH subframe that is closest in time to $1280-|T_{TX\_diff2}-T_{TX\_diff1}|$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to any implementation manner of the first to third implementation manners of the fourth aspect, in a sixth implementation manner of the fourth aspect, the acquiring the boundary information of the HS-DPCCH according to the boundary information of the HS-SCCH includes:

determining boundary information of an HS-DPCCH subframe that is closest in time to $1280+T_{TX\_diff1}-T_{TX\_diff2}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

According to a fifth aspect, an embodiment of the present invention provides a channel boundary locating method, including:

calculating, by a user equipment (UE), boundary information HS-SCCH CFN_DRX n of a high speed shared control channel (HS-SCCH) according to a timing difference $T_{TX\_diff}$ between a downlink F-DPCH frame of non-time reference cell and an HS-PDSCH subframe of non-time reference cell and a timing difference $\tau_{DIFF}$ between an HS-PDSCH subframe of time reference cell and the HS-PDSCH subframe of non-time reference cell; and acquiring, by the UE, boundary information of a high speed dedicated physical control channel (HS-DPCCH) according to the boundary information of the HS-SCCH.

With reference to the fifth aspect, in a first implementation manner of the fifth aspect, the calculating boundary information HS-SCCH CFN_DRX n of a high speed shared control channel (HS-SCCH) according to a timing difference $T_{TX\_diff}$ between a downlink F-DPCH frame of non-time reference cell and an HS-PDSCH subframe of non-time reference cell and a timing difference $\tau_{DIFF}$ between an HS-PDSCH subframe of time reference cell and the HS-PDSCH subframe of non-time reference cell includes:

aligning a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets $-3840 \text{chips} \leq \tau_{DRX} - T_0 - 7680*\text{DRX\_OFFSET} < 3840$ chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where when the UE is not configured in multiple-input multiple-output mode, or when the UE is configured in multiple-input multiple-output mode and the UE indicates not requiring a longer HARQ processing time, DRX_OFFSET is $$\left\lfloor \frac{\frac{T_{TX\_diff}}{2560}-0.9}{3} \right\rfloor - \left\lfloor \left| \frac{\frac{T_{TX\_diff}-\tau_{DIFF}}{2560}-0.9}{3} \right| \right\rfloor,$$

$$\left\lfloor \frac{\frac{T_{TX\_diff}}{2560}-0.9}{3} \right\rfloor - \left\lfloor \frac{\frac{T_{TX\_diff}-\lfloor \frac{\tau_{DIFF}}{256} \rfloor \times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}-\lceil \frac{\tau_{DIFF}}{256} \rceil \times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}-\text{round}(\frac{\tau_{DIFF}}{256}) \times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{|T_{TX\_diff}-\frac{\tau_{DIFF}}{256}| \times 256}{2560}-0.9}{3} \right\rfloor,$$

-continued $$\text{or } \left\lfloor \frac{\frac{T_{TX\_diff}}{2560} - 0.9}{3} \right\rfloor - \left\lfloor \frac{\frac{\left\lceil T_{TX\_diff} - \frac{\tau_{DIFF}}{256} \right\rceil \times 256}{2560} - 0.9}{3} \right\rfloor.$$

when the UE is configured in multiple-input multiple-output mode and the UE indicates requiring a longer HARQ processing time, DRX_OFFSET is $$\left\lfloor \frac{\frac{T_{TX\_diff}}{2560} - 0.9}{3} \right\rfloor - \left\lfloor \frac{\frac{T_{TX\_diff} + \tau_{DIFF}}{2560} - 0.9}{3} \right\rfloor,$$

$$\left\lfloor \frac{\frac{T_{TX\_diff}}{2560} - 0.9}{3} \right\rfloor - \left\lfloor \frac{\frac{T_{TX\_diff} + \lfloor \frac{\tau_{DIFF}}{256} \rfloor \times 256}{2560} - 0.9}{3} \right\rfloor,$$

$$\left\lfloor \frac{\frac{T_{TX\_diff}}{2560} - 0.9}{3} \right\rfloor - \left\lfloor \frac{\frac{T_{TX\_diff} + \lceil \frac{\tau_{DIFF}}{256} \rceil \times 256}{2560} - 0.9}{3} \right\rfloor,$$

$$\left\lfloor \frac{\frac{T_{TX\_diff}}{2560} - 0.9}{3} \right\rfloor - \left\lfloor \frac{\frac{T_{TX\_diff} + \text{round}(\frac{\tau_{DIFF}}{256}) \times 256}{2560} - 0.9}{3} \right\rfloor,$$

$$\left\lfloor \frac{\frac{T_{TX\_diff}}{2560} - 0.9}{3} \right\rfloor - \left\lfloor \frac{\frac{\lfloor T_{TX\_diff} + \frac{\tau_{DIFF}}{256} \rfloor \times 256}{2560} - 0.9}{3} \right\rfloor,$$

$$\text{or } \left\lfloor \frac{\frac{T_{TX\_diff}}{2560} - 0.9}{3} \right\rfloor - \left\lfloor \frac{\frac{\lceil T_{TX\_diff} + \frac{\tau_{DIFF}}{256} \rceil \times 256}{2560} - 0.9}{3} \right\rfloor.$$

With reference to the fifth aspect or the first implementation manner of the fifth aspect, in a second implementation manner of the fifth aspect, the acquiring the boundary information of the HS-DPCCH according to the boundary information of the HS-SCCH includes:

when the UE is not configured in multiple-input multiple-output mode, or when the UE is configured in multiple-input multiple-output mode and the UE indicates not requiring a longer HARQ processing time, determining boundary information of an HS-DPCCH subframe that is closest in time to $1280-\tau_{DIFF}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to the fifth aspect or the first implementation manner of the fifth aspect, in a third implementation manner of the fifth aspect, the acquiring the boundary information of the HS-DPCCH according to the boundary information of the HS-SCCH includes:

when the UE is configured in multiple-input multiple-output mode and the UE indicates requiring a longer HARQ processing time, determining boundary information of an HS-DPCCH subframe that is closest in time to $1280+\tau_{DIFF}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

According to a sixth aspect, an embodiment of the present invention provides a channel boundary locating method, including:

calculating, by a user equipment (UE), boundary information HS-SCCH CFN_DRX n of a high speed shared control channel (HS-SCCH) according to a timing difference $T_{TX\_diff,B}$ between a downlink F-DPCH frame of non-time reference cell and an HS-PDSCH subframe of non-time reference cell and a timing difference $T_{TX\_diff,A}$ between a downlink F-DPCH frame of time reference cell and an HS-PDSCH subframe of time reference cell; and acquiring, by the UE, boundary information of a high speed dedicated physical control channel (HS-DPCCH) according to the boundary information of the HS-SCCH.

With reference to the sixth aspect, in a first possible implementation manner of the sixth aspect, the calculating boundary information HS-SCCH CFN_DRX n of a high speed shared control channel (HS-SCCH) according to a timing difference $T_{TX\_diff,B}$ between a downlink F-DPCH frame of non-time reference cell and an HS-PDSCH subframe of non-time reference cell and a timing difference $T_{TX\_diff,A}$ between a downlink F-DPCH frame of time reference cell and an HS-PDSCH subframe of time reference cell includes:

aligning a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets $-3840\text{chips} \leq \tau_{DRX}-T_0-7680*\text{DRX\_OFFSET} < 3840$ chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $T_0$ is a timing difference between HS-SCCH CFN_DRX n and F-DPCH CFN n, where DRX_OFFSET is $$\left\lfloor \frac{\frac{T_{TX\_diff,B}}{2560} - 0.9}{3} \right\rfloor - \left\lfloor \frac{\frac{T_{TX\_diff,A}}{2560} - 0.9}{3} \right\rfloor;$$

a hybrid automatic retransmission request acknowledgement (HARQ-ACK) field corresponding to the HS-PDSCH subframe corresponding to $T_{TX\_diff,B}$ and a hybrid automatic retransmission request acknowledgement (HARQ-ACK) field corresponding to the HS-PDSCH subframe corresponding to $T_{TX\_diff,A}$ are in a same HS-DPCCH subframe; and $|T_{TX\_diff,B}-T_{TX\_diff,A}|<7680$ or $|T_{TX\_diff,B}-T_{TX\_diff,A}| \leq 3840$.

With reference to the sixth aspect or the first possible implementation manner of the sixth aspect, in a second possible implementation manner of the sixth aspect, the acquiring the boundary information of the HS-DPCCH according to the boundary information of the HS-SCCH includes:

when the UE is not configured in multiple-input multiple-output mode, or when the UE is configured in multiple-input multiple-output mode and the UE indicates not requiring a longer HARQ processing time, determining boundary information of an HS-DPCCH subframe that is closest in time to $1280-|T_{TX\_diff,B}-T_{TX\_diff,A}|$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to the sixth aspect or the first possible implementation manner of the sixth aspect, in a third possible implementation manner of the sixth aspect, the acquiring the boundary information of the HS-DPCCH according to the boundary information of the HS-SCCH includes:

when the UE is configured in multiple-input multiple-output mode and the UE indicates requiring a longer HARQ processing time, determining boundary information of an HS-DPCCH subframe that is closest in time to $1280+|T_{TX\_diff,B}-T_{TX\_diff,A}|$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to the sixth aspect or the first possible implementation manner of the sixth aspect, in a fourth possible implementation manner of the sixth aspect, the acquiring the boundary information of the HS-DPCCH according to the boundary information of the HS-SCCH includes:

determining boundary information of an HS-DPCCH subframe that is closest in time to $1280+T_{TX\_diff,A}-T_{TX\_diff,B}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

According to a seventh aspect, an embodiment of the present invention provides a base station, including:

a receiving module, configured to receive cell timing information delivered by a network, where the cell timing information includes a non-time reference parameter, and the non-time reference parameter corresponds to a smallest timing difference between a downlink F-DPCH frame of time reference cell and an HS-PDSCH subframe of time reference cell; and a processing module, configured to calculate boundary information HS-SCCH CFN_DRX n of a high speed shared control channel (HS-SCCH) according to the non-time reference parameter, where:

the processing module is further configured to acquire boundary information of a high speed dedicated physical control channel (HS-DPCCH) according to the boundary information of the HS-SCCH.

With reference to the seventh aspect, in a first implementation manner of the seventh aspect, the processing module is further configured to:

align a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets $-3840\text{chips} \leq \tau_{DRX} - T_0 - 7680 * DRX\_OFFSET < 3840$ chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where DRX_OFFSET is $$\left\lfloor \frac{\frac{T_{TX\_diff2}}{2560}-0.9}{3} \right\rfloor - \left\lfloor \frac{\frac{T_{TX\_diff1}}{2560}-0.9}{3} \right\rfloor;$$

$T_{TX\_diff2}$ is equal to a smallest timing difference between a downlink F-DPCH frame of non-time reference cell and an HS-PDSCH subframe of non-time reference cell; and $T_{TX\_diff1}$ is equal to the Non-time Reference.

With reference to the seventh aspect, in a second implementation manner of the seventh aspect, the processing module is further configured to:

align a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets $-3840\text{chips} \leq T_{DRX} - T_0 - 7680 * DRX\_OFFSET < 3840$ chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where DRX_OFFSET is $$\left\lfloor \frac{\frac{T_{TX\_diff2}}{2560}-0.9}{3} \right\rfloor - \left\lfloor \frac{\frac{T_{TX\_diff1}}{2560}-0.9}{3} \right\rfloor;$$

$T_{TX\_diff1}$ is equal to the Non-time Reference; and if $T_{TX\_diff3}$ is less than 7680×1.5, less than 7680×2, or less than 7680×2.5, $T_{TX\_diff2}$ is equal to $T_{TX\_diff3}$; and if $T_{TX\_diff3}$ is greater than or equal to 7680×1.5, greater than or equal to 7680×2, or greater than or equal to 7680×2.5, $T_{TX\_diff2}$ is equal to $T_{TX\_diff3}-38400$, where $T_{TX\_diff3}$ is equal to a timing difference between a downlink F-DPCH frame of non-time reference cell and an HS-PDSCH subframe of non-time reference cell, and a hybrid automatic retransmission request acknowledgement (HARQ-ACK) field corresponding to the HS-PDSCH subframe corresponding to $T_{TX\_diff3}$ and a hybrid automatic retransmission request acknowledgement (HARQ-ACK) field corresponding to the HS-PDSCH subframe corresponding to the Non-time Reference are in a same HS-DPCCH subframe.

With reference to the seventh aspect, in a third implementation manner of the seventh aspect, the processing module is further configured to:

align a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets −3840chips≤$T_{DRX}$−$T_0$−7680*DRX_OFFSET<3840 chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where DRX_OFFSET is $$\left\lfloor \frac{\frac{T_{TX\_diff2}}{2560}-0.9}{3}\right\rfloor - \left\lfloor\frac{\frac{T_{TX\_diff1}}{2560}-0.9}{3}\right\rfloor;$$

and if $T_{TX\_diff3}$ is less than 7680×1.5, less than 7680×2, or less than 7680×2.5, $T_{TX\_diff2}$ is equal to $T_{TX\_diff3}$, and $T_{TX\_diff1}$ is equal to the Non-time Reference; and if $T_{TX\_diff3}$ is greater than or equal to 7680×1.5, greater than or equal to 7680×2, or greater than or equal to 7680×2.5, $T_{TX\_diff2}$ is equal to a smallest timing difference between a downlink F-DPCH frame of non-time reference cell and an HS-PDSCH subframe of non-time reference cell, and $T_{TX\_diff1}$ is equal to the Non-time Reference plus 7680, where $T_{TX\_diff3}$ is a timing difference between the downlink F-DPCH frame of non-time reference cell and the HS-PDSCH subframe of non-time reference cell, and a hybrid automatic retransmission request acknowledgement (HARQ-ACK) field corresponding to the HS-PDSCH subframe corresponding to $T_{TX\_diff3}$ and a hybrid automatic retransmission request acknowledgement (HARQ-ACK) field corresponding to the HS-PDSCH subframe corresponding to the Non-time Reference are in a same HS-DPCCH subframe.

With reference to any one of the first to third implementation manners of the seventh aspect, in a fourth implementation manner of the seventh aspect, the processing module is further configured to:

when a UE is not configured in multiple-input multiple-output mode, or when the UE is configured in multiple-input multiple-output mode and the UE indicates not requiring a longer HARQ processing time, determine boundary information of an HS-DPCCH subframe that is closest in time to 1280-|$T_{TX\_diff2}$−$T_{TX\_diff1}$| chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to any one of the first to third implementation manners of the seventh aspect, in a fifth implementation manner of the seventh aspect, the processing module is further configured to:

when a UE is configured in multiple-input multiple-output mode and the UE indicates requiring a longer HARQ processing time, determine boundary information of an HS-DPCCH subframe that is closest in time to 1280+|$T_{TX\_diff2}$−$T_{TX\_diff1}$| chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to any one of the first to third implementation manners of the seventh aspect, in a sixth implementation manner of the seventh aspect, the processing module is further configured to:

determine boundary information of an HS-DPCCH subframe that is closest in time to 1280+$T_{TX\_diff1}$−$T_{TX\_diff2}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

According to an eighth aspect, an embodiment of the present invention provides a base station, including:

a preprocessing module, configured to calculate boundary information HS-SCCH CFN_DRX n of a high speed shared control channel (HS-SCCH) according to a timing difference $T_{TX\_diff}$ between a downlink F-DPCH frame of non-time reference cell and an HS-PDSCH subframe of non-time reference cell and a timing difference $\tau_{DIFF}$ between an HS-PDSCH subframe of time reference cell and the HS-PDSCH subframe of non-time reference cell; and a processing module, configured to acquire boundary information of a high speed dedicated physical control channel (HS-DPCCH) according to the boundary information of the HS-SCCH.

With reference to the eighth aspect, in a first implementation manner of the eighth aspect, the preprocessing module is further configured to:

align a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets −3840chips≤$T_{DRX}$−$T_0$−7680*DRX_OFFSET<3840 chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where when a user equipment (UE) is not configured in multiple-input multiple-output mode, or when the UE is configured in multiple-input multiple-output mode and the UE indicates not requiring a longer HARQ processing time, DRX_OFFSET is $$\left\lfloor \frac{\frac{T_{TX\_diff}}{2560}-0.9}{3}\right\rfloor - \left\lfloor\frac{\frac{T_{TX\_diff}-\tau_{DIFF}}{2560}-0.9}{3}\right\rfloor,$$

-continued $$\left\lfloor \dfrac{\frac{T_{TX\_diff}}{2560} - 0.9}{3} \right\rfloor - \left\lfloor \dfrac{\frac{T_{TX\_diff} - \lfloor\frac{\tau_{DIFF}}{256}\rfloor \times 256}{2560} - 0.9}{3} \right\rfloor,$$

$$\left\lfloor \dfrac{\frac{T_{TX\_diff}}{2560} - 0.9}{3} \right\rfloor - \left\lfloor \dfrac{\frac{T_{TX\_diff} - \lceil\frac{\tau_{DIFF}}{256}\rceil \times 256}{2560} - 0.9}{3} \right\rfloor,$$

$$\left\lfloor \dfrac{\frac{T_{TX\_diff}}{2560} - 0.9}{3} \right\rfloor - \left\lfloor \dfrac{\frac{T_{TX\_diff} - \text{round}(\frac{\tau_{DIFF}}{256}) \times 256}{2560} - 0.9}{3} \right\rfloor,$$

$$\left\lfloor \dfrac{\frac{T_{TX\_diff}}{2560} - 0.9}{3} \right\rfloor - \left\lfloor \dfrac{\frac{\lfloor T_{TX\_diff} - \frac{\tau_{DIFF}}{256}\rfloor \times 256}{2560} - 0.9}{3} \right\rfloor,$$

or $\left\lfloor \dfrac{\frac{T_{TX\_diff}}{2560} - 0.9}{3} \right\rfloor - \left\lfloor \dfrac{\frac{\lceil T_{TX\_diff} - \frac{\tau_{DIFF}}{256}\rceil \times 256}{2560} - 0.9}{3} \right\rfloor.$ or when a user equipment (UE) is configured in multiple-input multiple-output mode and the UE indicates requiring a longer HARQ processing time, DRX_OFFSET is $$\left\lfloor \dfrac{\frac{T_{TX\_diff}}{2560} - 0.9}{3} \right\rfloor - \left\lfloor \left| \dfrac{\frac{T_{TX\_diff} + \tau_{DIFF}}{2560} - 0.9}{3} \right| \right\rfloor,$$

$$\left\lfloor \dfrac{\frac{T_{TX\_diff}}{2560} - 0.9}{3} \right\rfloor - \left\lfloor \dfrac{\frac{T_{TX\_diff} + \lfloor\frac{\tau_{DIFF}}{256}\rfloor \times 256}{2560} - 0.9}{3} \right\rfloor,$$

$$\left\lfloor \dfrac{\frac{T_{TX\_diff}}{2560} - 0.9}{3} \right\rfloor - \left\lfloor \dfrac{\frac{T_{TX\_diff} + \lceil\frac{\tau_{DIFF}}{256}\rceil \times 256}{2560} - 0.9}{3} \right\rfloor,$$

$$\left\lfloor \dfrac{\frac{T_{TX\_diff}}{2560} - 0.9}{3} \right\rfloor - \left\lfloor \dfrac{\frac{T_{TX\_diff} + \text{round}(\frac{\tau_{DIFF}}{256}) \times 256}{2560} - 0.9}{3} \right\rfloor,$$

$$\left\lfloor \dfrac{\frac{T_{TX\_diff}}{2560} - 0.9}{3} \right\rfloor - \left\lfloor \dfrac{\frac{\lfloor T_{TX\_diff} + \frac{\tau_{DIFF}}{256}\rfloor \times 256}{2560} - 0.9}{3} \right\rfloor,$$

or $\left\lfloor \dfrac{\frac{T_{TX\_diff}}{2560} - 0.9}{3} \right\rfloor - \left\lfloor \dfrac{\frac{\lceil T_{TX\_diff} + \frac{\tau_{DIFF}}{256}\rceil \times 256}{2560} - 0.9}{3} \right\rfloor.$ With reference to the eighth aspect or the first implementation manner of the eighth aspect, in a second implementation manner of the eighth aspect, the processing module is further configured to:

when the UE is not configured in multiple-input multiple-output mode, or when the UE is configured in multiple-input multiple-output mode and the UE indicates not requiring a longer HARQ processing time, determine boundary information of an HS-DPCCH subframe that is closest in time to $1280-\tau_{DIFF}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DP-CCH CFN_DRX.

With reference to the eighth aspect or the first implementation manner of the eighth aspect, in a third implementation manner of the eighth aspect, the processing module is further configured to:

when the UE is configured in multiple-input multiple-output mode and the UE indicates requiring a longer HARQ processing time, determine boundary information of an HS-DPCCH subframe that is closest in time to $1280+\tau_{DIFF}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

According to a ninth aspect, an embodiment of the present invention provides a base station, including:

a preprocessing module, configured to calculate boundary information HS-SCCH CFN_DRX n of a high speed shared control channel (HS-SCCH) according to a timing difference $T_{TX\_diff,B}$ between a downlink F-DPCH frame of non-time reference cell and an HS-PDSCH subframe of non-time reference cell and a timing difference $T_{TX\_diff,A}$ between a downlink F-DPCH frame of time reference cell and an HS-PDSCH subframe of time reference cell; and a processing module, configured to acquire boundary information of a high speed dedicated physical control channel (HS-DPCCH) according to the boundary information of the HS-SCCH.

With reference to the ninth aspect, in a first implementation manner of the ninth aspect, the preprocessing module is further configured to:

align a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets $-3840\text{chips} \leq T_{DRX} - T_0 - 7680*\text{DRX\_OFFSET} < 3840$ chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where DRX_OFFSET is $$\left| \left\lfloor \dfrac{\frac{T_{TX\_diff,B}}{2560} - 0.9}{3} \right\rfloor - \left\lfloor \dfrac{\frac{T_{TX\_diff,A}}{2560} - 0.9}{3} \right\rfloor \right|;$$

a hybrid automatic retransmission request acknowledgement (HARQ-ACK) field corresponding to the HS-PDSCH subframe corresponding to $T_{TX\_diff,B}$ and a hybrid automatic retransmission request acknowledgement (HARQ-ACK) field corresponding to the HS-PDSCH subframe corresponding to $T_{TX\_diff,A}$ are in a same HS-DPCCH subframe; and $|T_{TX\_diff,B} - T_{TX\_diff,A}| < 7680$ or $|T_{TX\_diff,B} - T_{TX\_diff,A}| \leq 3840$.

With reference to the ninth aspect or the first implementation manner of the ninth aspect, in a second implementation manner of the ninth aspect, the processing module is further configured to:

when a user equipment (UE) is not configured in multiple-input multiple-output mode, or when the UE is configured in multiple-input multiple-output mode and the UE indicates not requiring a longer HARQ processing time, determine boundary information of an HS-DPCCH subframe that is closest in time to $1280-|T_{TX\_diff,B}-T_{TX\_diff,A}|$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to the ninth aspect or the first implementation manner of the ninth aspect, in a third implementation manner of the ninth aspect, the processing module is further configured to:

when a user equipment (UE) is configured in multiple-input multiple-output mode and the UE indicates requiring a longer HARQ processing time, determine boundary information of an HS-DPCCH subframe that is closest in time to $1280+|T_{TX\_diff,B}-T_{TX\_diff,A}|$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to the ninth aspect or the first implementation manner of the ninth aspect, in a fourth implementation manner of the ninth aspect, the processing module is further configured to:

determine boundary information of an HS-DPCCH subframe that is closest in time to $1280+T_{TX\_diff,A}-T_{TX\_diff,B}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

According to a tenth aspect, an embodiment of the present invention provides a user equipment (UE), including:

a preprocessing module, configured to calculate boundary information HS-SCCH CFN_DRX n of a high speed shared control channel (HS-SCCH) according to a smallest timing difference between a downlink F-DPCH frame of time reference cell and an HS-PDSCH subframe of time reference cell; and a processing module, configured to acquire boundary information of a high speed dedicated physical control channel (HS-DPCCH) according to the boundary information of the HS-SCCH.

With reference to the tenth aspect, in a first implementation manner of the tenth aspect, the preprocessing module is further configured to:

align a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets $-3840\text{chips} \leq \tau_{DRX}-T_0-7680*\text{DRX\_OFFSET} < 3840$ chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where DRX_OFFSET is $$\left\lfloor \frac{\frac{T_{TX\_diff2}}{2560}-0.9}{3} \right\rfloor - \left\lfloor \frac{\frac{T_{TX\_diff1}}{2560}-0.9}{3} \right\rfloor;$$

$T_{TX\_diff2}$ is equal to a smallest timing difference between a downlink F-DPCH frame of non-time reference cell and an HS-PDSCH subframe of non-time reference cell; and $T_{TX\_diff1}$ is equal to the smallest timing difference between the downlink F-DPCH frame of time reference cell and the HS-PDSCH subframe of time reference cell.

With reference to the tenth aspect, in a second implementation manner of the tenth aspect, the preprocessing module is further configured to:

align a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets $-3840\text{chips} \leq \tau_{DRX}-T_0-7680*\text{DRX\_OFFSET} < 3840$ chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where DRX_OFFSET is $$\left\lfloor \frac{\frac{T_{TX\_diff2}}{2560}-0.9}{3} \right\rfloor - \left\lfloor \frac{\frac{T_{TX\_diff1}}{2560}-0.9}{3} \right\rfloor;$$

$T_{TX\_diff1}$ is equal to the smallest timing difference between the downlink F-DPCH frame of time reference cell and the HS-PDSCH subframe of time reference cell; and if $T_{TX\_diff3}$ is less than $7680 \times 1.5$, less than $7680 \times 2$, or less than $7680 \times 2.5$, $T_{TX\_diff2}$ is equal to $T_{TX\_diff3}$; and if $T_{TX\_diff3}$ is greater than or equal to $7680 \times 1.5$, greater than or equal to $7680 \times 2$, or greater than or equal to $7680 \times 2.5$, $T_{TX\_diff2}$ is equal to $T_{TX\_diff3}-38400$, where $T_{TX\_diff3}$ is a timing difference between a downlink F-DPCH frame of non-time reference cell and an HS-PDSCH subframe of non-time reference cell, and a hybrid automatic retransmission request acknowledgement (HARQ-ACK) field corresponding to the HS-PDSCH subframe corresponding to $T_{TX\_diff3}$ and a hybrid automatic retransmission request acknowledgement (HARQ-ACK) field corresponding to the HS- PDSCH subframe corresponding to $T_{TX\_diff1}$ are in a same HS-DPCCH subframe.

With reference to the tenth aspect, in a third implementation manner of the tenth aspect, the preprocessing module is further configured to:
align a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets −3840chips≤$\tau_{DRX}$−$T_0$−7680*DRX_OFFSET <3840 chips, and $T_0$ is 1024 chips, where
CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where
DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

and
if $T_{TX\_diff3}$ is less than 7680×1.5, less than 7680×2, or less than 7680×2.5, $T_{TX\_diff2}$ is equal to $T_{TX\_diff3}$, and $T_{TX\_diff1}$ is equal to the smallest timing difference between the downlink F-DPCH frame of time reference cell and the HS-PDSCH subframe of time reference cell; and if $T_{TX\_diff3}$ is greater than or equal to 7680×1.5, greater than or equal to 7680×2, or greater than or equal to 7680×2.5, $T_{TX\_diff2}$ is equal to a smallest timing difference between a downlink F-DPCH frame of non-time reference cell and an HS-PDSCH subframe of non-time reference cell, and $T_{TX\_diff1}$ is equal to 7680 plus the smallest timing difference between the downlink F-DPCH frame of time reference cell and the HS-PDSCH subframe of time reference cell, where
$T_{TX\_diff3}$ is a timing difference between the downlink F-DPCH frame of non-time reference cell and the HS-PDSCH subframe of non-time reference cell, and a hybrid automatic retransmission request acknowledgement (HARQ-ACK) field corresponding to the HS-PDSCH subframe corresponding to $T_{TX\_diff3}$ and a hybrid automatic retransmission request acknowledgement (HARQ-ACK) field corresponding to the HS-PDSCH subframe corresponding to the smallest timing difference between the downlink F-DPCH frame of time reference cell and the HS-PDSCH subframe of time reference cell are in a same HS-DPCCH subframe.

With reference to any one of the first to third implementation manners of the tenth aspect, in a fourth implementation manner of the tenth aspect, the processing module is further configured to:
when the UE is not configured in multiple-input multiple-output mode, or when the UE is configured in multiple-input multiple-output mode and the UE indicates not requiring a longer HARQ processing time, determine boundary information of an HS-DPCCH subframe that is closest in time to 1280−|$T_{TX\_diff2}$−$T_{TX\_diff1}$| chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to any one of the first to third implementation manners of the tenth aspect, in a fifth implementation manner of the tenth aspect, the processing module is further configured to:
when the UE is configured in multiple-input multiple-output mode and the UE indicates requiring a longer HARQ processing time, determine boundary information of an HS-DPCCH subframe that is closest in time to 1280+|$T_{TX\_diff2}$−$T_{TX\_diff1}$| chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to any one of the first to third implementation manners of the tenth aspect, in a sixth implementation manner of the tenth aspect, the processing module is further configured to:
determine boundary information of an HS-DPCCH subframe that is closest in time to 1280+$T_{TX\_diff1}$−$T_{TX\_diff2}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

According to an eleventh aspect, an embodiment of the present invention provides a user equipment (UE), including:
a preprocessing module, configured to calculate boundary information HS-SCCH CFN_DRX n of a high speed shared control channel (HS-SCCH) according to a timing difference $T_{TX\_diff}$ between a downlink F-DPCH frame of non-time reference cell and an HS-PDSCH subframe of non-time reference cell and a timing difference $\tau_{DIFF}$ between an HS-PDSCH subframe of time reference cell and the HS-PDSCH subframe of non-time reference cell; and
a processing module, configured to acquire boundary information of a high speed dedicated physical control channel (HS-DPCCH) according to the boundary information of the HS-SCCH.

With reference to the eleventh aspect, in a first implementation manner of the eleventh aspect, the preprocessing module is further configured to:
align a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets −3840chips≤$\tau_{DRX}$−$T_0$−7680*DIV(OFFSET <3840 chips and $T_0$ is 1024 chips, where
CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where when the UE is not configured in multiple-input multiple-output mode, or when the UE is configured in multiple-input multiple-output mode and the UE indicates not requiring a longer HARQ processing time, DRX_OFFSET is $$\left\lfloor \frac{\frac{T_{TX\_diff}}{2560}-0.9}{3} \right\rfloor - \left\lfloor \left\lfloor \frac{\frac{T_{TX\_diff}-\tau_{DIFF}}{2560}-0.9}{3} \right\rfloor \right\rfloor,$$

$$\left\lfloor \frac{\frac{T_{TX\_diff}}{2560}-0.9}{3} \right\rfloor - \left\lfloor \frac{\frac{T_{TX\_diff}-\lfloor\frac{\tau_{DIFF}}{256}\rfloor\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}-\lceil\frac{\tau_{DIFF}}{256}\rceil\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}-\text{round}(\frac{\tau_{DIFF}}{256})\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{\lfloor T_{TX\_diff}-\frac{\tau_{DIFF}}{256}\rfloor\times 256}{2560}-0.9}{3} \right\rfloor,$$

$$\text{or } \left\lfloor \frac{\frac{T_{TX\_diff}}{2560}-0.9}{3} \right\rfloor - \left\lfloor \frac{\frac{\lceil T_{TX\_diff}-\frac{\tau_{DIFF}}{256}\rceil\times 256}{2560}-0.9}{3} \right\rfloor;$$

or when the UE is configured in multiple-input multiple-output mode and the UE indicates requiring a longer HARQ processing time, DRX_OFFSET is $$\left\lfloor \frac{\frac{T_{TX\_diff}}{2560}-0.9}{3} \right\rfloor - \left\lfloor \left\lfloor \frac{\frac{T_{TX\_diff}+\tau_{DIFF}}{2560}-0.9}{3} \right\rfloor \right\rfloor,$$

$$\left\lfloor \frac{\frac{T_{TX\_diff}}{2560}-0.9}{3} \right\rfloor - \left\lfloor \frac{\frac{T_{TX\_diff}+\lfloor\frac{\tau_{DIFF}}{256}\rfloor\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}+\lceil\frac{\tau_{DIFF}}{256}\rceil\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}+\text{round}(\frac{\tau_{DIFF}}{256})\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{\lfloor T_{TX\_diff}+\frac{\tau_{DIFF}}{256}\rfloor\times 256}{2560}-0.9}{3} \right\rfloor,$$

$$\text{or } \left\lfloor \frac{\frac{T_{TX\_diff}}{2560}-0.9}{3} \right\rfloor - \left\lfloor \frac{\frac{\lceil T_{TX\_diff}+\frac{\tau_{DIFF}}{256}\rceil\times 256}{2560}-0.9}{3} \right\rfloor.$$

With reference to the eleventh aspect or the first implementation manner of the eleventh aspect, in a second implementation manner of the eleventh aspect, the processing module is further configured to:

when the UE is not configured in multiple-input multiple-output mode, or when the UE is configured in multiple-input multiple-output mode and the UE indicates not requiring a longer HARQ processing time, determine boundary information of an HS-DPCCH subframe that is closest in time to 1280−$\tau_{DIFF}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to the eleventh aspect or the first implementation manner of the eleventh aspect, in a third implementation manner of the eleventh aspect, the processing module is further configured to:

when the UE is configured in multiple-input multiple-output mode and the UE indicates requiring a longer HARQ processing time, determine boundary information of an HS-DPCCH subframe that is closest in time to 1280+$\tau_{DIFF}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

According to a twelfth aspect, an embodiment of the present invention provides a user equipment (UE), including:

a preprocessing module, configured to calculate boundary information HS-SCCH CFN_DRX n of a high speed shared control channel (HS-SCCH) according to a timing difference $T_{TX\_diff,B}$ between a downlink F-DPCH frame of non-time reference cell and an HS-PDSCH subframe of non-time reference cell and a timing difference $T_{TX\_diff,A}$ between a downlink F-DPCH frame of time reference cell and an HS-PDSCH subframe of time reference cell; and a processing module, configured to acquire boundary information of a high speed dedicated physical control channel (HS-DPCCH) according to the boundary information of the HS-SCCH.

With reference to the twelfth aspect, in a first possible implementation manner of the twelfth aspect, the preprocessing module is further configured to:

align a start time of HS-SCCH CFN_DRX n with a start time of an HS-SCCH subframe, where the HS-SCCH subframe is an HS-SCCH subframe behind $\tau_{DRX}$ chips in a start time of F-DPCH CFN n, $\tau_{DRX}$ meets −3840chips≤$\tau_{DRX}$−$T_0$−7680*DRX_OFFSET <3840 chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and $\tau_{DRX}$ is a timing difference between HS-SCCH CFN_DRX n and F-DPCH CFN n, where DRX_OFFSET is $$\left\lfloor \frac{\frac{T_{TX\_diff,B}}{2560}-0.9}{3} \right\rfloor - \left\lfloor \frac{\frac{T_{TX\_diff,A}}{2560}-0.9}{3} \right\rfloor;$$

a hybrid automatic retransmission request acknowledgement (HARQ-ACK) field corresponding to the HS-PDSCH subframe corresponding to $T_{TX\_diff,B}$ and a hybrid automatic retransmission request acknowledgement (HARQ-ACK) field corresponding to the HS-PDSCH subframe corresponding to $T_{TX\_diff,A}$ are in a same HS-DPCCH subframe, and $|T_{TX\_diff,B}-T_{TX\_diff,A}|<7680$ or $|T_{TX\_diff,B}-T_{TX\_diff,A}|\leq 3840$.

With reference to the twelfth aspect or the first possible implementation manner of the twelfth aspect, in a second possible implementation manner of the twelfth aspect, the processing module is further configured to:

when the UE is not configured in multiple-input multiple-output mode, or when the UE is configured in multiple-input multiple-output mode and the UE indicates not requiring a longer HARQ processing time, determine boundary information of an HS-DPCCH subframe that is closest in time to 1280−$|T_{TX\_diff,B}-T_{TX\_diff,A}|$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to the twelfth aspect or the first possible implementation manner of the twelfth aspect, in a third possible implementation manner of the twelfth aspect, the processing module is further configured to:

when the UE is configured in multiple-input multiple-output mode and the UE indicates requiring a longer HARQ processing time, determine boundary information of an HS-DPCCH subframe that is closest in time to 1280+$|T_{TX\_diff,B}-T_{TX\_diff,A}|$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

With reference to the twelfth aspect or the first possible implementation manner of the twelfth aspect, in a fourth possible implementation manner of the twelfth aspect, the processing module is further configured to:

determine boundary information of an HS-DPCCH subframe that is closest in time to 1280+$T_{TX\_diff,A}-T_{TX\_diff,B}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

According to a thirteenth aspect, an embodiment of the present invention provides a base station, including a memory and a processor, where the memory is connected to the processor; and the memory stores an execution instruction; and when the base station runs, the processor communicates with the memory, and the processor executes the execution instruction, so that the base station executes the method according to any one of the first to third aspects.

According to a fourteenth aspect, an embodiment of the present invention provides a user equipment (UE), including a memory and a processor, where the memory is connected to the processor; and the memory stores an execution instruction; and when the UE runs, the processor communicates with the memory, and the processor executes the execution instruction, so that the UE executes the method according to any one of the fourth to sixth aspects.

According to the channel boundary locating method, the base station, and the user equipment provided in the embodiments of the present invention, a non-time reference cell receives cell timing information delivered by a network, and adjusts an HS-DPCCH boundary of non-time reference cell, where the cell timing information includes a non-time reference parameter, and the non-time reference parameter corresponds to a smallest timing difference between a downlink F-DPCH frame of time reference cell and an HS-PDSCH subframe of time reference cell. This implements that the non-time reference cell accurately locates the HS-DPCCH boundary, so that the non-time reference cell can learn correct data transmission feedback information and CQI information, which improves reliability of downlink data transmission, and resolves a problem in the prior art that a non-time reference cell incorrectly locates an HS-DPCCH boundary, which eventually affects performance of downlink data transmission.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

It should be noted that "$\lceil \cdot \rceil \lfloor \cdot \rfloor$" in the present invention are symbols denoting rounding up and rounding down, respectively, and a function of round( ) denotes a function of rounding off.

Figure 1:
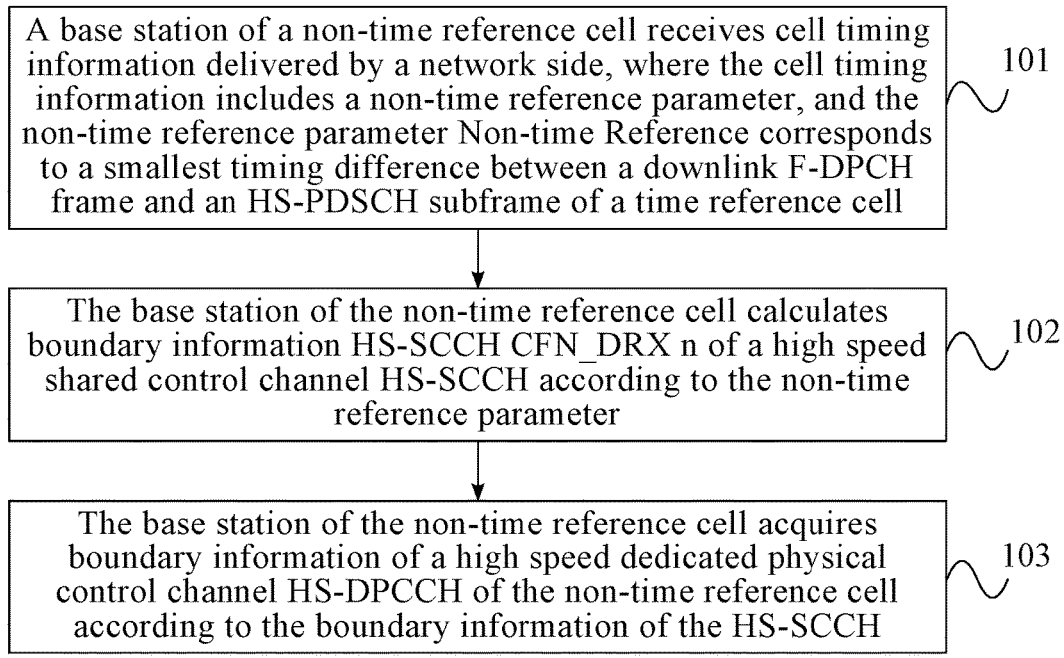
FIG. 1 is a flowchart of Embodiment 1 of a channel boundary locating method according to the present invention.

FIG. 1 is a flowchart of Embodiment 1 of a channel boundary locating method according to the present invention. This embodiment is executed by a base station, where the base station may be a base station of non-time reference cell, and the base station may be implemented by using software and/or hardware. As shown in FIG. 1, the method according to this embodiment may include:

Step 101: A base station of non-time reference cell receives cell timing information delivered by a network, where the cell timing information includes a non-time reference parameter, and the non-time reference parameter corresponds to a smallest timing difference between a downlink F-DPCH frame of time reference cell and an HS-PDSCH subframe of time reference cell.

Step 102: The base station of non-time reference cell calculates boundary information HS-SCCH CFN_DRX n of a high speed shared control channel (HS-SCCH) according to the non-time reference parameter.

Step 103: The base station of non-time reference cell acquires boundary information of a high speed dedicated physical control channel (HS-DPCCH) according to the boundary information of the HS-SCCH.

Specifically, the base station of non-time reference cell receives the cell timing information delivered by the network, where the cell timing information includes the non-time reference parameter, and the Non-time Reference refers to the smallest timing difference, that is, smallest $T_{TX\_diff}$, between the downlink F-DPCH frame of time reference cell and the HS-PDSCH subframe of time reference cell; calculates the boundary information of the HS-SCCH according to the non-time reference parameter; and eventually obtains the boundary information of the HS-DPCCH according to the boundary information of the HS-SCCH.

Optionally, the calculating boundary information HS-SCCH CFN_DRX n of a high speed shared control channel (HS-SCCH) according to the non-time reference parameter includes:

aligning a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets $-3840 \leq \tau_{DRX} - T_0 - 7680*DRX\_OFFSET < 3840$, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

$T_{TX\_diff2}$ is equal to a smallest timing difference between a downlink F-DPCH frame of non-time reference cell and an HS-PDSCH subframe of non-time reference cell; and $T_{TX\_diff1}$ is equal to the Non-time Reference.

Specifically, the boundary information, that is, HS-SCCH CFN_DRX n, of the HS-SCCH starts at the start time of the HS-SCCH subframe, where the HS-SCCH subframe is the HS-SCCH subframe behind τDRX chips after the start time of F-DPCH CFN n, τDRX meets $-3840 \leq \tau_{DRX} - T_0 - 7680*DRX\_OFFSET < 3840$, and $T_0$ is 1024 chips, where DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

$T_{TX\_diff2}$ is equal to the smallest timing difference between the downlink F-DPCH frame of non-time reference cell and the HS-PDSCH subframe of non-time reference cell; and $T_{TX\_diff1}$ is equal to the Non-time Reference.

Optionally, the calculating boundary information HS-SCCH CFN_DRX n of a high speed shared control channel (HS-SCCH) according to the non-time reference parameter includes:

aligning a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets $-3840 \text{chips} \leq \tau_{DRX} - T_0 - 7680*DRX\_OFFSET < 3840 \text{chips}$, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

$T_{TX\_diff1}$ is equal to the Non-time Reference; and if $T_{TX\_diff3}$ is less than 7680×1.5, less than 7680×2, or less than 7680×2.5, $T_{TX\_diff2}$ is equal to $T_{TX\_diff3}$; and if $T_{TX\_diff3}$ is greater than or equal to 7680×1.5, greater than or equal to 7680×2, or greater than or equal to 7680×2.5, $T_{TX\_diff2}$ is equal to $T_{TX\_diff3}$−38400, where $T_{TX\_diff3}$ is equal to a timing difference between a downlink F-DPCH frame of non-time reference cell and an HS-PDSCH subframe of non-time reference cell, and a hybrid automatic retransmission request acknowledgement (HARQ-ACK) field corresponding to the HS-PDSCH subframe corresponding to $T_{TX\_diff3}$ and a hybrid automatic retransmission request acknowledgement (HARQ-ACK) field corresponding to the HS-PDSCH subframe corresponding to the Non-time Reference are in a same HS-DPCCH subframe.

Specifically, the HS-PDSCH subframe corresponding to $T_{TX\_diff3}$ is the HS-PDSCH subframe that is used for calculating the timing difference between the downlink F-DPCH frame of non-time reference cell and the HS-PDSCH subframe of non-time reference cell, and the HARQ-ACK field corresponding to the HS-PDSCH subframe and the HARQ-ACK field corresponding to the HS-PDSCH subframe corresponding to the Non-time Reference are in the same HS-DPCCH subframe.

Optionally, the calculating boundary information HS-SCCH CFN_DRX n of a high speed shared control channel (HS-SCCH) according to the non-time reference parameter includes:

aligning a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets −3840≤chips $\tau_{DRX}$−$T_0$−7680*DRX_OFFSET <3840chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where
DRX_OFFSET is $$\left\lfloor \frac{\frac{T_{TX\_diff2}}{2560}-0.9}{3} \right\rfloor - \left\lfloor \frac{\frac{T_{TX\_diff1}}{2560}-0.9}{3} \right\rfloor;$$

and if $T_{TX\_diff3}$ is less than 7680×1.5, less than 7680×2, or less than 7680×2.5, $T_{TX\_diff2}$ is equal to $T_{TX\_diff3}$, and $T_{TX\_diff1}$ is equal to the Non-time Reference; and if $T_{TX\_diff3}$ is greater than or equal to 7680×1.5, greater than or equal to 7680×2, or greater than or equal to 7680×2.5, $T_{TX\_diff2}$ is equal to a smallest timing difference between a downlink F-DPCH frame of non-time reference cell and an HS-PDSCH subframe of non-time reference cell, and $T_{TX\_diff1}$ is equal to the Non-time Reference plus 7680, where $T_{TX\_diff3}$ is a timing difference between the downlink F-DPCH frame of non-time reference cell and the HS-PDSCH subframe of non-time reference cell, and a hybrid automatic retransmission request acknowledgement (HARQ-ACK) field corresponding to the HS-PDSCH subframe corresponding to $T_{TX\_diff3}$ and a hybrid automatic retransmission request acknowledgement (HARQ-ACK) field corresponding to the HS-PDSCH subframe corresponding to the Non-time Reference are in a same HS-DPCCH subframe.

Optionally, the acquiring the boundary information of the HS-DPCCH according to the boundary information of the HS-SCCH includes:

when a UE is not configured in multiple-input multiple-output mode, or when the UE is configured in multiple-input multiple-output mode and the UE indicates not requiring a longer HARQ processing time, determining boundary information of an HS-DPCCH subframe that is closest in time to 1280−|$T_{TX\_diff2}$−$T_{TX\_diff1}$| chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Specifically, when the UE is not configured in multiple-input multiple-output mode, or when the UE is configured in multiple-input multiple-output mode and the UE indicates not requiring a longer HARQ processing time, the boundary information of the HS-DPCCH subframe that is closest in time to 1280−|$T_{TX\_diff2}$−$T_{TX\_diff1}$| chips after the start time of HS-SCCH CFN_DRX n is determined as the boundary information of the HS-DPCCH; in this case, $T_{TX\_diff1}$ is less than $T_{TX\_diff2}$.

It should be noted that if 1280−|$T_{TX\_diff2}$−$T_{TX\_diff1}$| chips is a positive value, i calculation is performed backwards from the start time of HS-SCCH CFN_DRX n; and if 1280−|$T_{TX\_diff2}$−$T_{TX\_diff1}$| chips is a negative value, calculation is performed forwards from the start time of HS-SCCH CFN_DRX n.

Optionally, the acquiring the boundary information of the HS-DPCCH according to the boundary information of the HS-SCCH includes:

when a UE is configured in multiple-input multiple-output mode and the UE indicates requiring a longer HARQ processing time, determining boundary information of an HS-DPCCH subframe that is closest in time to 1280+|$T_{TX\_diff2}$−$T_{TX\_diff1}$| chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Specifically, when the UE is configured in multiple-input multiple-output mode and the UE indicates requiring a longer HARQ processing time, the boundary information of the HS-DPCCH subframe that is closest in time to 1280+|$T_{TX\_diff2}$−$T_{TX\_diff1}$| chips after the start time of HS-SCCH CFN_DRX n is determined as the boundary information of the HS-DPCCH; in this case, $T_{TX\_diff1}$ is greater than $T_{TX\_diff2}$.

Optionally, the acquiring the boundary information of the HS-DPCCH according to the boundary information of the HS-SCCH includes:

determining boundary information of an HS-DPCCH subframe that is closest in time to 1280+$T_{TX\_diff1}$−$T_{TX\_diff2}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Specifically, because values of $T_{TX\_diff1}$ and $T_{TX\_diff2}$ are different depending on different modes in which the UE is configured and on whether a longer HARQ processing time is required, which mode the UE is configured in can be indicated without using an absolute value, that is, the boundary information of the HS-DPCCH subframe that is closest in time to $1280|T_{TX\_diff1} - T_{TX\_diff2}|$ chips after the start time of HS-SCCH CFN_DRX n can be directly determined as the boundary information of the HS-DPCCH.

Figure 1A:
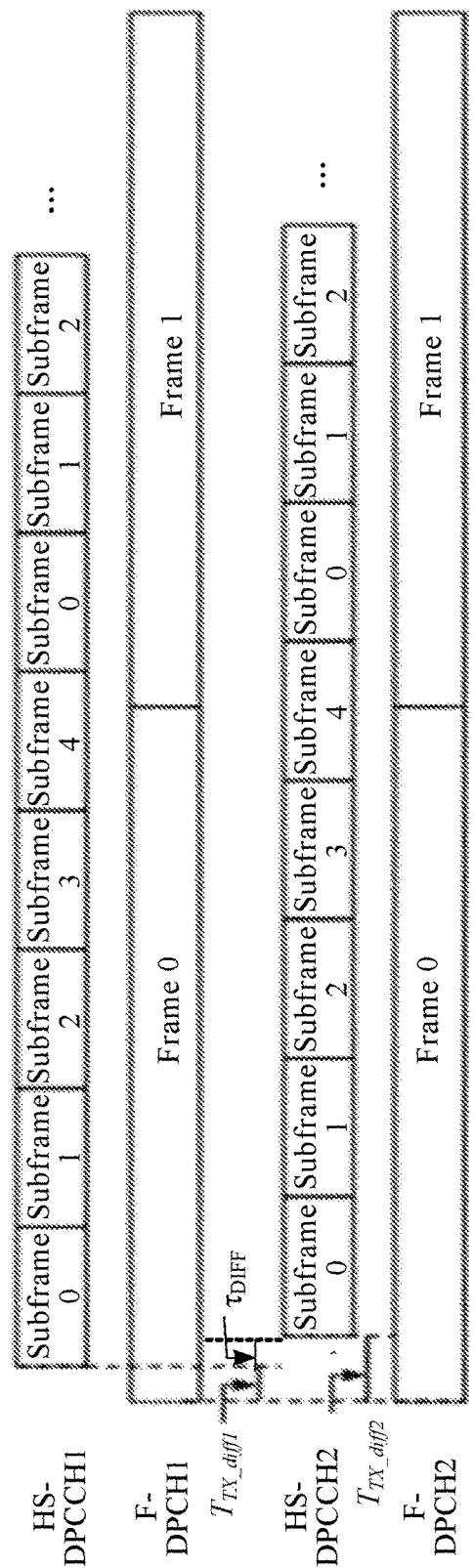
FIG. 1A is a first schematic diagram of a timing difference in Embodiment 1 of a channel boundary locating method according to the present invention.
Figure 1B:
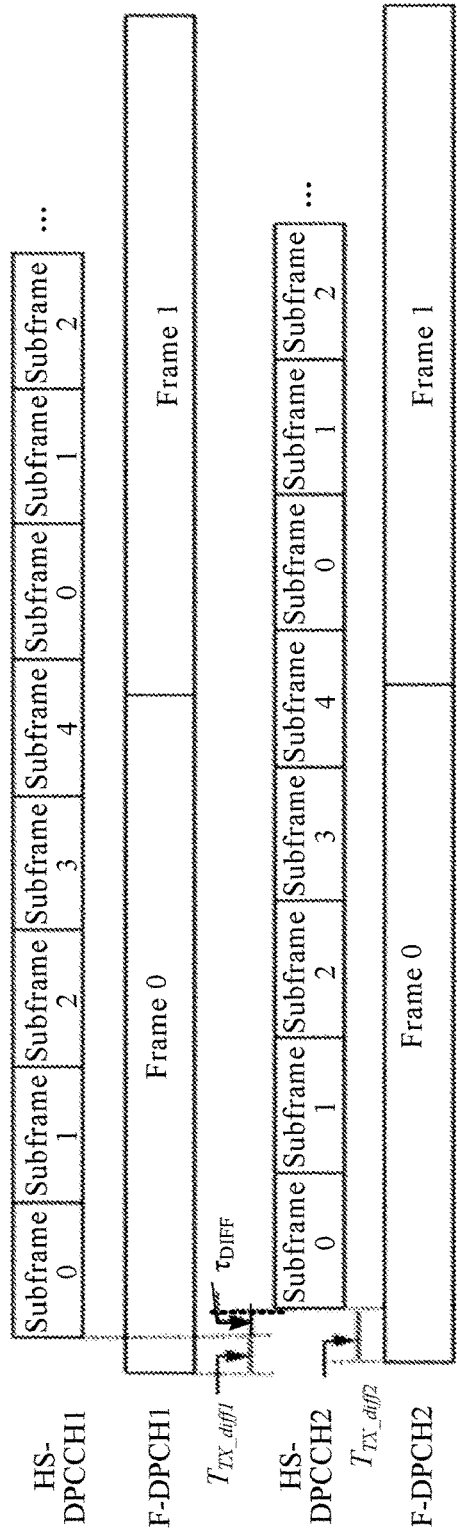
FIG. 1B is a second schematic diagram of a timing difference in Embodiment 1 of a channel boundary locating method according to the present invention.

In this embodiment of the present invention, DRX_OFFSET may be calculated by using the foregoing manners in either of cases in which F-DPCH frames of time reference cell and the non-time reference cell are aligned with each other and not aligned with each other. Therefore, accurate boundary information of an HS-SCCH may be obtained in either of the cases in which F-DPCH frames are aligned with each other and not aligned with each other, thereby obtaining accurate boundary information of an HS-DPCCH. FIG. 1A is a first schematic diagram of a timing difference in Embodiment 1 of the channel boundary locating method according to the present invention, and FIG. 1B is a second schematic diagram of a timing difference of Embodiment 1 of the channel boundary locating method according to the present invention. As shown in FIG. 1A, the F-DPCH frames of time reference cell and the non-time reference cell are aligned with each other. In the figure, HS-DPCCH 1 and F-DPCH 1 represent an HS-DPCCH and an F-DPCH of time reference cell, respectively; and HS-DPCCH 2 and F-DPCH 2 represent an HS-DPCCH and an F-DPCH of non-time reference cell, respectively.

As shown in FIG. 1A, $T_{TX\_diff1} = T_{TX\_diff2} \pm \tau_{DIFF}$, where $\tau_{DIFF}$ is a timing difference between matching HS-PDSCH subframes of time reference cell and the non-time reference cell;

DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

and boundary information of an HS-DPCCH that is closest in time to $1280 - / + |T_{TX\_diff2} - T_{TX\_diff1}|$ or $1280 + T_{TX\_diff2} - T_{TX\_diff1}$ chips after the start time of HS-SCCH CFN_DRX n is determined as the boundary information of the HS-DPCCH, that is, HS-DPCCH CFN_DRX n.

As shown in FIG. 1B, the F-DPCH frames of time reference cell and the non-time reference cell are not aligned with each other. In the figure, HS-DPCCH 1 and F-DPCH 1 represent an HS-DPCCH and an F-DPCH of time reference cell, respectively; and HS-DPCCH 2 and F-DPCH 2 represent an HS-DPCCH and an F-DPCH of non-time reference cell, respectively.

$$T_{TX\_diff1} = T_{TX\_diff2} \pm \tau_{DIFF} + (\tau_{F\text{-}DPCH2} - \tau_{F\text{-}DPCH1}) \quad (1), \text{ where}$$

$\tau_{F\text{-}DPCH1}$ and $\tau_{F\text{-}DPCH2}$ represent timing of F-DPCHs of time reference cell and the non-time reference cell, respectively; and DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor.$$

According to formula (1), it may be obtained that $\tau_{DIFF} = |T_{TX\_diff2} - T_{TX\_diff1} + \tau_{F\text{-}DPCH2} - \tau_{F\text{-}DPCH1}|$ because $|T_{TX\_diff2} - T_{TX\_diff1}| - |\tau_{F\text{-}DPCH2} - \tau_{F\text{-}DPCH1}| \leq |T_{TX\_diff2} - T_{TX\_diff1} + \tau_{F\text{-}DPCH2} - \tau_{F\text{-}DPCH1}| \leq |T_{TX\_diff2} - T_{TX\_diff1}| + |\tau_{F\text{-}DPCH2} - \tau_{F\text{-}DPCH1}|$, and a maximum value of $|\tau_{F\text{-}DPCH2} - \tau_{F\text{-}DPCH1}|$ is equal to 128 chips.

Therefore, $|T_{TX\_diff2} - T_{TX\_diff1}| - 128 \leq |T_{TX\_diff2} - T_{TX\_diff1} + \tau_{F\text{-}DPCH2} - \tau_{F\text{-}DPCH1}| \leq |T_{TX\_diff2} - T_{TX\_diff1}| + 128$, that is, $|T_{TX\_diff2} - T_{TX\_diff1} + \tau_{F\text{-}DPCH2} - \tau_{F\text{-}DPCH1}|$ and $|T_{TX\_diff2} - T_{TX\_diff1}|$ are different by 128 chips at most, where 128 chips are much shorter than a length of half a subframe.

In practice, an accurate value of $\tau_{DIFF}$ cannot be obtained easily, and HS-DPCCH CFN_DRX is defined as "a subframe closest in time" in the description; therefore, $|T_{TX\_diff2} - T_{TX\_diff1}|$ may be used to replace $\tau_{DIFF}$ calculated according to formula (1). That is, $12804 - / + |T_{TX\_diff2} - T_{TX\_diff1}|$ or $1280 + T_{TX\_diff1} - T_{TX\_diff2}$ is used in HS-DPCCH CFN_DRX, so that no boundary error occurs, and fairly accurate boundary information of the HS-DPCCH can be obtained.

In this embodiment, a non-time reference cell receives cell timing information delivered by a network, and adjusts an HS-DPCCH boundary of non-time reference cell, where the cell timing information includes a non-time reference parameter, and the non-time reference parameter corresponds to a smallest timing difference between a downlink F-DPCH frame of time reference cell and an HS-PDSCH subframe of time reference cell. This implements that the non-time reference cell accurately locates the HS-DPCCH boundary, so that the non-time reference cell can learn correct data transmission feedback information and CQI information, which improves reliability of downlink data transmission, and resolves a problem in the prior art that a non-time reference cell incorrectly locates an HS-DPCCH boundary, which eventually affects performance of downlink data transmission.

Figure 2:
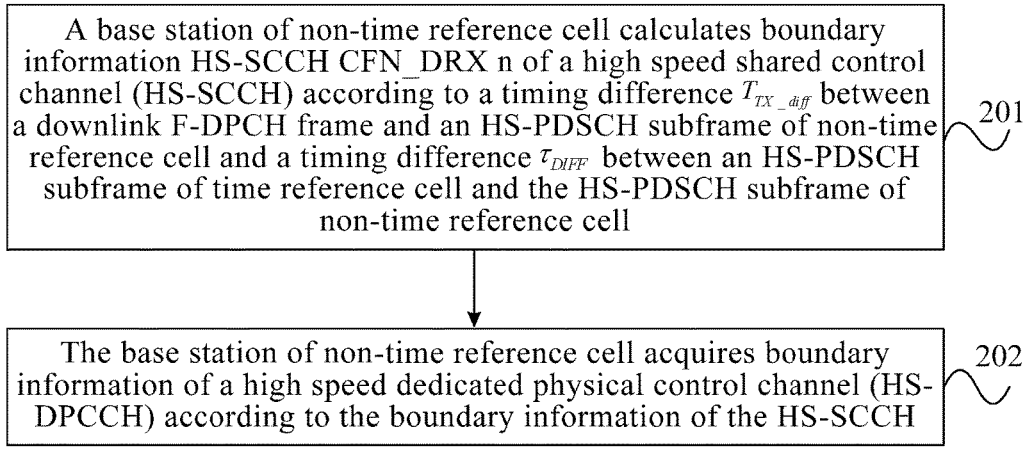
FIG. 2 is a flowchart of Embodiment 2 of a channel boundary locating method according to the present invention.

FIG. 2 is a flowchart of Embodiment 2 of a channel boundary locating method according to the present invention. This embodiment is executed by a base station, where the base station may be a base station of non-time reference cell, and the base station may be implemented by using software and/or hardware. As shown in FIG. 2, the method according to this embodiment may include:

Step 201: A base station of non-time reference cell calculates boundary information HS-SCCH CFN_DRX n of a high speed shared control channel (HS-SCCH) according to a timing difference $T_{TX\_diff}$ between a downlink F-DPCH frame of non-time reference cell and an HS-PDSCH subframe of non-time reference cell and a timing difference $\tau_{DIFF}$ between an HS-PDSCH subframe of time reference cell and the HS-PDSCH subframe of non-time reference cell.

Step 202: The base station of non-time reference cell acquires boundary information of a high speed dedicated physical control channel (HS-DPCCH) according to the boundary information of the HS-SCCH.

Optionally, the calculating boundary information HS-SCCH CFN_DRX n of a high speed shared control channel (HS-SCCH) according to a timing difference $T_{TX\_diff}$ between a downlink F-DPCH frame of non-time reference cell and an HS-PDSCH subframe of non-time reference cell and a timing difference $\tau_{DIFF}$ between an HS-PDSCH subframe of time reference cell and the HS-PDSCH subframe of non-time reference cell includes:

aligning a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets −3840 chips≤τ$_{DRX}$−T$_0$−7680*DRX_OFFSET<3840 chips, and T$_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where when a user equipment (UE) is not configured in multiple-input multiple-output mode, or when the UE is configured in multiple-input multiple-output mode and the UE indicates not requiring a longer HARQ processing time, DRX_OFFSET is $$\left\lfloor \frac{\frac{T_{TX\_diff}}{2560} - 0.9}{3} \right\rfloor - \left\lfloor \left\lfloor \frac{\frac{T_{TX\_diff} - \tau_{DIFF}}{2560} - 0.9}{3} \right\rfloor \right\rfloor,$$

$$\left\lfloor \frac{\frac{T_{TX\_diff}}{2560} - 0.9}{3} \right\rfloor - \left\lfloor \frac{\frac{T_{TX\_diff} - \lfloor \frac{\tau_{DIFF}}{256} \rfloor \times 256}{2560} - 0.9}{3} \right\rfloor,$$

$$\left\lfloor \frac{\frac{T_{TX\_diff}}{2560} - 0.9}{3} \right\rfloor - \left\lfloor \frac{\frac{T_{TX\_diff} - \lceil \frac{\tau_{DIFF}}{256} \rceil \times 256}{2560} - 0.9}{3} \right\rfloor,$$

$$\left\lfloor \frac{\frac{T_{TX\_diff}}{2560} - 0.9}{3} \right\rfloor - \left\lfloor \frac{\frac{T_{TX\_diff} - \text{round}(\frac{\tau_{DIFF}}{256}) \times 256}{2560} - 0.9}{3} \right\rfloor,$$

$$\left\lfloor \frac{\frac{T_{TX\_diff}}{2560} - 0.9}{3} \right\rfloor - \left\lfloor \frac{\frac{\lfloor T_{TX\_diff} - \frac{\tau_{DIFF}}{256} \rfloor \times 256}{2560} - 0.9}{3} \right\rfloor,$$

or $$\left\lfloor \frac{\frac{T_{TX\_diff}}{2560} - 0.9}{3} \right\rfloor - \left\lfloor \frac{\frac{\lceil T_{TX\_diff} - \frac{\tau_{DIFF}}{256} \rceil \times 256}{2560} - 0.9}{3} \right\rfloor;$$

or when a user equipment (UE) is configured in multiple-input multiple-output mode and the UE indicates requiring a longer HARQ processing time, DRX_OFFSET is $$\left\lfloor \frac{\frac{T_{TX\_diff}}{2560} - 0.9}{3} \right\rfloor - \left\lfloor \left\lfloor \frac{\frac{T_{TX\_diff} + \tau_{DIFF}}{2560} - 0.9}{3} \right\rfloor \right\rfloor,$$

$$\left\lfloor \frac{\frac{T_{TX\_diff}}{2560} - 0.9}{3} \right\rfloor - \left\lfloor \frac{\frac{T_{TX\_diff} + \lfloor \frac{\tau_{DIFF}}{256} \rfloor \times 256}{2560} - 0.9}{3} \right\rfloor,$$

$$\left\lfloor \frac{\frac{T_{TX\_diff}}{2560} - 0.9}{3} \right\rfloor - \left\lfloor \frac{\frac{T_{TX\_diff} + \lceil \frac{\tau_{DIFF}}{256} \rceil \times 256}{2560} - 0.9}{3} \right\rfloor,$$

$$\left\lfloor \frac{\frac{T_{TX\_diff}}{2560} - 0.9}{3} \right\rfloor - \left\lfloor \frac{\frac{T_{TX\_diff} + \text{round}(\frac{\tau_{DIFF}}{256}) \times 256}{2560} - 0.9}{3} \right\rfloor,$$

-continued $$\left\lfloor \frac{\frac{T_{TX\_diff}}{2560} - 0.9}{3} \right\rfloor - \left\lfloor \frac{\frac{\lfloor T_{TX\_diff} + \frac{\tau_{DIFF}}{256} \rfloor \times 256}{2560} - 0.9}{3} \right\rfloor,$$

or $$\left\lfloor \frac{\frac{T_{TX\_diff}}{2560} - 0.9}{3} \right\rfloor - \left\lfloor \frac{\frac{\lceil T_{TX\_diff} + \frac{\tau_{DIFF}}{256} \rceil \times 256}{2560} - 0.9}{3} \right\rfloor.$$

Optionally, the acquiring the boundary information of the HS-DPCCH according to the boundary information of the HS-SCCH includes:

when the UE is not configured in multiple-input multiple-output mode, or when the UE is configured in multiple-input multiple-output mode and the UE indicates not requiring a longer HARQ processing time, determining boundary information of an HS-DPCCH subframe that is closest in time to 1280−τ$_{DIFF}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the acquiring the boundary information of the HS-DPCCH according to the boundary information of the HS-SCCH includes:

when the UE is configured in multiple-input multiple-output mode and the UE indicates requiring a longer HARQ processing time, determining boundary information of an HS-DPCCH subframe that is closest in time to 1280+τ$_{DIFF}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

In this embodiment, an implementation principle and a technical effect are similar to those in Embodiment 1 of the method, which are not described repeatedly in this embodiment.

Figure 3:
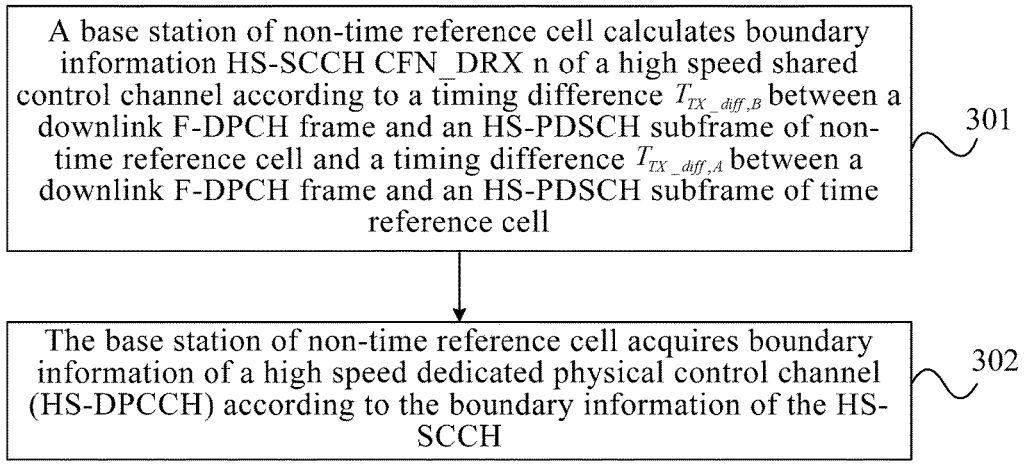
FIG. 3 is a flowchart of Embodiment 3 of a channel boundary locating method according to the present invention.

FIG. 3 is a flowchart of Embodiment 3 of a channel boundary locating method according to the present invention. This embodiment is executed by a base station, where the base station may be a base station of non-time reference cell, and the base station may be implemented by using software and/or hardware. As shown in FIG. 3, the method according to this embodiment may include:

Step 301: A base station of non-time reference cell calculates boundary information HS-SCCH CFN_DRX n of a high speed shared control channel (HS-SCCH) according to a timing difference T$_{TX\_diff,B}$ between a downlink F-DPCH frame of non-time reference cell and an HS-PDSCH subframe of non-time reference cell and a timing difference T$_{TX\_diff,A}$ between a downlink F-DPCH frame of time reference cell and an HS-PDSCH subframe of time reference cell.

Step 302: The base station of non-time reference cell acquires boundary information of a high speed dedicated physical control channel (HS-DPCCH) according to the boundary information of the HS-SCCH.

Optionally, the calculating boundary information HS-SCCH CFN_DRX n of a high speed shared control channel (HS-SCCH) according to a timing difference $T_{TX\_diff,B}$ between a downlink F-DPCH frame of non-time reference cell and an HS-PDSCH subframe of non-time reference cell and a timing difference $T_{TX\_diff,A}$ between a downlink F-DPCH frame of time reference cell and an HS-PDSCH subframe of time reference cell includes:

aligning a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets −3840chips≤τ$_{DRX}$−T$_0$−7680*DRX_OFFSET <3840chips, and T$_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where DRX_OFFSET is $$\left\lfloor \frac{\frac{T_{TX\_diff,B}}{2560}-0.9}{3} \right\rfloor - \left\lfloor \frac{\frac{T_{TX\_diff,A}}{2560}-0.9}{3} \right\rfloor;$$

a hybrid automatic retransmission request acknowledgement (HARQ-ACK) field corresponding to the HS-PDSCH subframe corresponding to $T_{TX\_diff,B}$ and a hybrid automatic retransmission request acknowledgement (HARQ-ACK) field corresponding to the HS-PDSCH subframe corresponding to $T_{TX\_diff,A}$ are in a same HS-DPCCH subframe; and $|T_{TX\_diff,B}-T_{TX\_diff,A}|<7680$ or $|T_{TX\_diff,B}-T_{TX\_diff,A}|\leq 3840$.

Optionally, the acquiring the boundary information of the HS-DPCCH according to the boundary information of the HS-SCCH includes:

when a user equipment (UE) is not configured in multiple-input multiple-output mode, or when the UE is configured in multiple-input multiple-output mode and the UE indicates not requiring a longer HARQ processing time, determining boundary information of an HS-DPCCH subframe that is closest in time to 1280−$|T_{TX\_diff,B}-T_{TX\_diff,A}|$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the acquiring the boundary information of the HS-DPCCH according to the boundary information of the HS-SCCH includes:

when a user equipment (UE) is configured in multiple-input multiple-output mode and the UE indicates requiring a longer HARQ processing time, determining boundary information of an HS-DPCCH subframe that is closest in time to 1280+$|T_{TX\_diff,B}-T_{TX\_diff,A}|$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the acquiring the boundary information of the HS-DPCCH according to the boundary information of the HS-SCCH includes:

determining boundary information of an HS-DPCCH subframe that is closest in time to 1280+$T_{TX\_diff,A}$−$T_{TX\_diff,B}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

In this embodiment, an implementation principle and a technical effect are similar to those in Embodiment 1 of the method, which are not described repeatedly in this embodiment.

Figure 4:
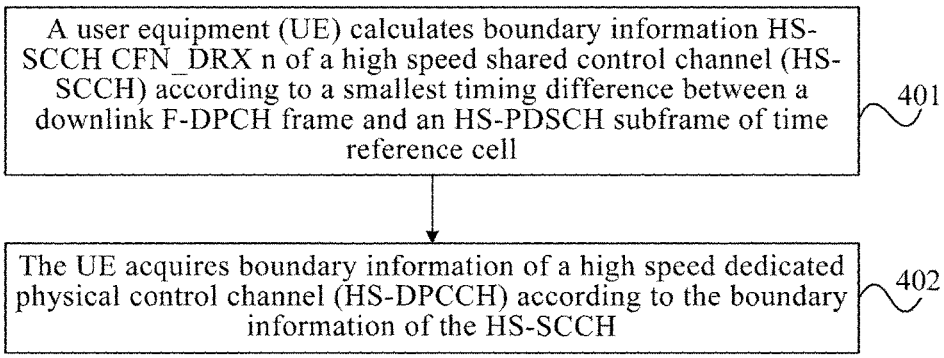
FIG. 4 is a flowchart of Embodiment 4 of a channel boundary locating method according to the present invention.

FIG. 4 is a flowchart of Embodiment 4 of a channel boundary locating method according to the present invention. This embodiment is executed by a user equipment (UE), and the UE may be implemented by using software and/or hardware. As shown in FIG. 4, the method according to this embodiment may include:

Step 401: A user equipment (UE) calculates boundary information HS-SCCH CFN_DRX n of a high speed shared control channel (HS-SCCH) according to a smallest timing difference between a downlink F-DPCH frame of time reference cell and an HS-PDSCH subframe of time reference cell.

Step 402: The UE acquires boundary information of a high speed dedicated physical control channel (HS-DPCCH) according to the boundary information of the HS-SCCH.

Optionally, the calculating boundary information HS-SCCH CFN_DRX n of a high speed shared control channel (HS-SCCH) according to a smallest timing difference between a downlink F-DPCH frame of time reference cell and an HS-PDSCH subframe of time reference cell includes:

aligning a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets −3840chips≤τ$_{DRX}$−T$_0$−7680*DRX_OFFSET <3840chips, and T$_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where DRX_OFFSET is $$\left\lfloor \frac{\frac{T_{TX\_diff2}}{2560}-0.9}{3} \right\rfloor - \left\lfloor \frac{\frac{T_{TX\_diff1}}{2560}-0.9}{3} \right\rfloor;$$

$T_{TX\_diff2}$ is equal to a smallest timing difference between a downlink F-DPCH frame of non-time reference cell and an HS-PDSCH subframe of non-time reference cell; and $T_{TX\_diff1}$ is equal to the smallest timing difference between the downlink F-DPCH frame of time reference cell and the HS-PDSCH subframe of time reference cell.

Optionally, the calculating boundary information HS-SCCH CFN_DRX n of a high speed shared control channel (HS-SCCH) according to a smallest timing difference between a downlink F-DPCH frame of time reference cell and an HS-PDSCH subframe of time reference cell includes:

aligning a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets $-3840chips \leq \tau_{DRX} - T_0 - 7680 * DRX\_OFFSET < 3840chips$, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

$T_{TX\_diff1}$ is equal to the smallest timing difference between the downlink F-DPCH frame of time reference cell and the HS-PDSCH subframe of time reference cell; and if $T_{TX\_diff3}$ is less than 7680×1.5, less than 7680×2, or less than 7680×2.5, $T_{TX\_diff2}$ is equal to $T_{TX\_diff3}$; and if $T_{TX\_diff3}$ is greater than or equal to 7680×1.5, greater than or equal to 7680×2, or greater than or equal to 7680×2.5, $T_{TX\_diff2}$ is equal to $T_{TX\_diff3} - 38400$, where $T_{TX\_diff3}$ is a timing difference between a downlink F-DPCH frame of non-time reference cell and an HS-PDSCH subframe of non-time reference cell, and a hybrid automatic retransmission request acknowledgement (HARQ-ACK) field corresponding to the HS-PDSCH subframe corresponding to $T_{TX\_diff3}$ and a hybrid automatic retransmission request acknowledgement (HARQ-ACK) field corresponding to the HS-PDSCH subframe corresponding to $T_{TX\_diff1}$ are in a same HS-DPCCH subframe.

Optionally, the calculating boundary information HS-SCCH CFN_DRX n of a high speed shared control channel (HS-SCCH) according to a smallest timing difference between a downlink F-DPCH frame of time reference cell and an HS-PDSCH subframe of time reference cell includes:

aligning a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets $-3840chips \leq \tau_{DRX} - T_0 - 7680 * DRX\_OFFSET < 3840chips$, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

and if $T_{TX\_diff3}$ is less than 7680×1.5, less than 768×2, or less than 7680×2.5, $T_{TX\_diff2}$ is equal to $T_{TX\_diff3}$, and $T_{TX\_diff1}$ is equal to the smallest timing difference between the downlink F-DPCH frame of time reference cell and the HS-PDSCH subframe of time reference cell; and if $T_{TX\_diff3}$ is greater than or equal to 7680×1.5, greater than or equal to 7680×2, or greater than or equal to 7680×2.5, $T_{TX\_diff2}$ is equal to a smallest timing difference between a downlink F-DPCH frame of non-time reference cell and an HS-PDSCH subframe of non-time reference cell, and $T_{TX\_diff1}$ is equal to 7680 plus the smallest timing difference between the downlink F-DPCH frame of time reference cell and the HS-PDSCH subframe of time reference cell, where $T_{TX\_diff3}$ is a timing difference between the downlink F-DPCH frame of non-time reference cell and the HS-PDSCH subframe of non-time reference cell, and a hybrid automatic retransmission request acknowledgement (HARQ-ACK) field corresponding to the HS-PDSCH subframe corresponding to $T_{TX\_diff3}$ and a hybrid automatic retransmission request acknowledgement (HARQ-ACK) field corresponding to the HS-PDSCH subframe corresponding to the smallest timing difference between the downlink F-DPCH frame of time reference cell and the HS-PDSCH subframe of time reference cell are in a same HS-DPCCH subframe.

Optionally, the acquiring boundary information of a high speed dedicated physical control channel (HS-DPCCH) of non-time reference cell according to the boundary information of the HS-SCCH includes:

when the UE is not configured in multiple-input multiple-output mode, or when the UE is configured in multiple-input multiple-output mode and the UE indicates not requiring a longer HARQ processing time, determining boundary information of an HS-DPCCH subframe that is closest in time to $1280 - |T_{TX\_diff2} - T_{TX\_diff1}|$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the acquiring boundary information of a high speed dedicated physical control channel (HS-DPCCH) of a non-reference cell according to the boundary information of the HS-SCCH includes:

when the UE is configured in multiple-input multiple-output mode and the UE indicates requiring a longer HARQ processing time, determining boundary information of an HS-DPCCH subframe that is closest in time to $1280 + |T_{TX\_diff2} - T_{TX\_diff1}|$ chips after the start time of the boundary information of the HS-SCCH, that is, HS-SCCH CFN_DRX n, as the boundary information of the HS-DPCCH, that is, HS-DPCCH CFN- _DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the acquiring boundary information of a high speed dedicated physical control channel (HS-DPCCH) of a non-reference cell according to the boundary information of the HS-SCCH includes:

determining boundary information of an HS-DPCCH subframe that is closest in time to $1280+T_{TX\_diff1}-T_{TX\_diff2}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

In this embodiment, an implementation principle and a technical effect are similar to those in Embodiment 1 of the method, which are not described repeatedly in this embodiment.

Figure 5:
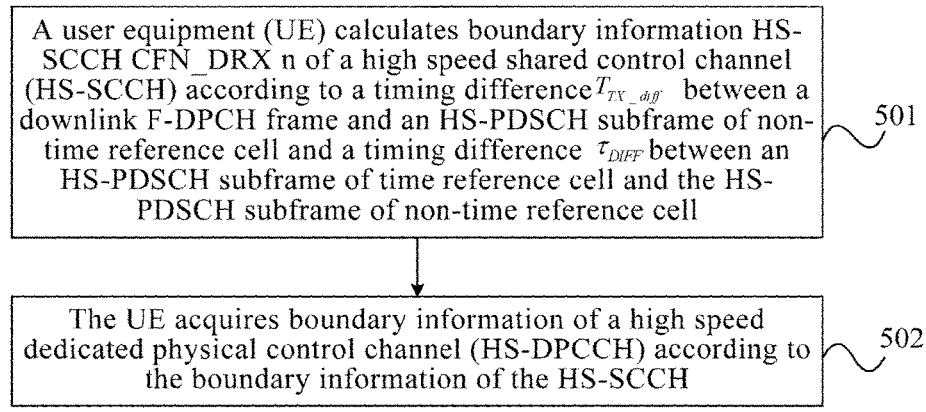
FIG. 5 is a flowchart of Embodiment 5 of a channel boundary locating method according to the present invention.

FIG. 5 is a flowchart of Embodiment 5 of a channel boundary locating method according to the present invention. This embodiment is executed by a user equipment (UE), and the UE may be implemented by using software and/or hardware. As shown in FIG. 5, the method according to this embodiment may include:

Step 501: A user equipment (UE) calculates boundary information HS-SCCH CFN_DRX n of a high speed shared control channel (HS-SCCH) according to a timing difference $T_{TX\_diff}$ between a downlink F-DPCH frame of non-time reference cell and an HS-PDSCH subframe of non-time reference cell and a timing difference $\tau_{DIFF}$ between a matching HS-PDSCH subframe of time reference cell and the HS-PDSCH subframe of non-time reference cell.

Step 502: The UE acquires boundary information of a high speed dedicated physical control channel (HS-DPCCH) according to the boundary information of the HS-SCCH.

Optionally, the calculating boundary information HS-SCCH CFN_DRX n of a high speed shared control channel (HS-SCCH) according to a timing difference $T_{TX\_diff}$ between a downlink F-DPCH frame of non-time reference cell and an HS-PDSCH subframe of non-time reference cell and a timing difference $\tau_{DIFF}$ between a matching HS-PDSCH subframe of time reference cell and the HS-PDSCH subframe of non-time reference cell includes:

aligning a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets $-3840\text{chips} \le \tau_{DRX}-T_0-7680*\text{DRX\_OFFSET} < 3840\text{chips}$, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where when the UE is not configured in multiple-input multiple-output mode, or when the UE is configured in multiple-input multiple-output mode and the UE indicates not requiring a longer HARQ processing time, DRX_OFFSET is $$\left\lfloor \frac{\frac{T_{TX\_diff}}{2560}-0.9}{3} \right\rfloor - \left\lfloor \left\lfloor \frac{\frac{T_{TX\_diff}-\tau_{DIFF}}{2560}-0.9}{3} \right\rfloor \right\rfloor,$$

$$\left\lfloor \frac{\frac{T_{TX\_diff}}{2560}-0.9}{3} \right\rfloor - \left\lfloor \frac{\frac{T_{TX\_diff}-\lfloor\frac{\tau_{DIFF}}{256}\rfloor \times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}-\lceil\frac{\tau_{DIFF}}{256}\rceil \times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}-\text{round}(\frac{\tau_{DIFF}}{256}) \times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{\lfloor T_{TX\_diff}-\frac{\tau_{DIFF}}{256}\rfloor \times 256}{2560}-0.9}{3} \right\rfloor,$$

or $$\left\lfloor \frac{\frac{T_{TX\_diff}}{2560}-0.9}{3} \right\rfloor - \left\lfloor \frac{\frac{\lceil T_{TX\_diff}-\frac{\tau_{DIFF}}{256}\rceil \times 256}{2560}-0.9}{3} \right\rfloor;$$

or when the UE is configured in multiple-input multiple-output mode and the UE indicates requiring a longer HARQ processing time, DRX_OFFSET is $$\left\lfloor \frac{\frac{T_{TX\_diff}}{2560}-0.9}{3} \right\rfloor - \left\lfloor \left\lfloor \frac{\frac{T_{TX\_diff}+\tau_{DIFF}}{2560}-0.9}{3} \right\rfloor \right\rfloor,$$

$$\left\lfloor \frac{\frac{T_{TX\_diff}}{2560}-0.9}{3} \right\rfloor - \left\lfloor \frac{\frac{T_{TX\_diff}+\lfloor\frac{\tau_{DIFF}}{256}\rfloor \times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}+\lceil\frac{\tau_{DIFF}}{256}\rceil \times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}+\text{round}(\frac{\tau_{DIFF}}{256}) \times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{\lfloor T_{TX\_diff}+\frac{\tau_{DIFF}}{256}\rfloor \times 256}{2560}-0.9}{3} \right\rfloor,$$

or $$\left\lfloor \frac{\frac{T_{TX\_diff}}{2560}-0.9}{3} \right\rfloor - \left\lfloor \frac{\frac{\lceil T_{TX\_diff}+\frac{\tau_{DIFF}}{256}\rceil \times 256}{2560}-0.9}{3} \right\rfloor.$$

Optionally, the acquiring the boundary information of the HS-DPCCH according to the boundary information of the HS-SCCH includes:

when the UE is not configured in multiple-input multiple-output mode, or when the UE is configured in multiple-input multiple-output mode and the UE indicates not requiring a longer HARQ processing time, determining boundary information of an HS-DPCCH subframe that is closest in time to $1280-\tau_{DIFF}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DP-CCH CFN_DRX.

Optionally, the acquiring the boundary information of the HS-DPCCH according to the boundary information of the HS-SCCH includes:

when the UE is configured in multiple-input multiple-output mode and the UE indicates requiring a longer HARQ processing time, determining boundary information of an HS-DPCCH subframe that is closest in time to 1280+$\tau_{DIFF}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

In this embodiment, an implementation principle and a technical effect are similar to those in Embodiment 1 of the method, which are not described repeatedly in this embodiment.

Figure 6:
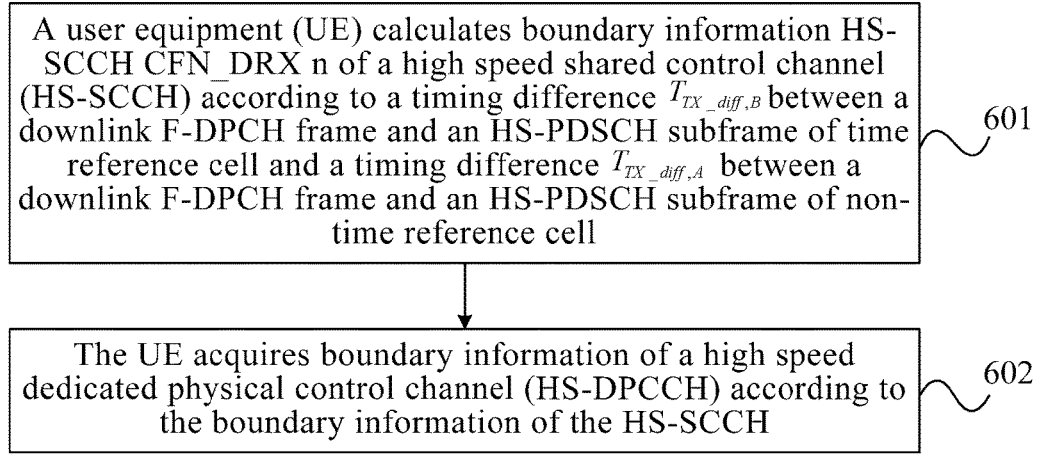
FIG. 6 is a flowchart of Embodiment 6 of a channel boundary locating method according to the present invention.

FIG. 6 is a flowchart of Embodiment 6 of a channel boundary locating method according to the present invention. This embodiment is executed by a user equipment (UE), and the UE may be implemented by using software and/or hardware. As shown in FIG. 6, the method according to this embodiment may include:

Step 601: A user equipment (UE) calculates boundary information HS-SCCH CFN_DRX n of a high speed shared control channel (HS-SCCH) according to a timing difference $T_{TX\_diff,B}$ between a downlink F-DPCH frame of non-time reference cell and an HS-PDSCH subframe of non-time reference cell and a timing difference $T_{TX\_diff,A}$ between a downlink F-DPCH frame of time reference cell and an HS-PDSCH subframe of time reference cell.

Step 602: The UE acquires boundary information of a high speed dedicated physical control channel (HS-DPCCH) according to the boundary information of the HS-SCCH.

Optionally, the calculating boundary information HS-SCCH CFN_DRX n of a high speed shared control channel (HS-SCCH) according to a timing difference $T_{TX\_diff,B}$ between a downlink F-DPCH frame of non-time reference cell and an HS-PDSCH subframe of non-time reference cell and a timing difference $T_{TX\_diff,A}$ between a downlink F-DPCH frame of time reference cell and an HS-PDSCH subframe of time reference cell includes:

aligning a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets −3840chips≤$\tau_{DRX}$−T$_0$−7680*DRX_OFFSET <3840chips, and T$_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where DRX_OFFSET is $$\left| \left\lfloor \frac{\frac{T_{TX\_diff,B}}{2560} - 0.9}{3} \right\rfloor - \left\lfloor \frac{\frac{T_{TX\_diff,A}}{2560} - 0.9}{3} \right\rfloor \right|;$$

a hybrid automatic retransmission request acknowledgement (HARQ-ACK) field corresponding to the HS-PDSCH subframe corresponding to $T_{TX\_diff,B}$ and a hybrid automatic retransmission request acknowledgement (HARQ-ACK) field corresponding to the HS-PDSCH subframe corresponding to $T_{TX\_diff,A}$ are in a same HS-DPCCH subframe; and |$T_{TX\_diff,B}$−$T_{TX\_diff,A}$|<7680 or |$T_{TX\_diff,B}$−$T_{TX\_diff,A}$|≤3840.

Optionally, the acquiring the boundary information of the HS-DPCCH according to the boundary information of the HS-SCCH includes:

when the UE is not configured in multiple-input multiple-output mode, or when the UE is configured in multiple-input multiple-output mode and the UE indicates not requiring a longer HARQ processing time, determining boundary information of an HS-DPCCH subframe that is closest in time to 1280−|$T_{TX\_diff,B}$−$T_{TX\_diff,A}$| chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the acquiring the boundary information of the HS-DPCCH according to the boundary information of the HS-SCCH includes:

when the UE is configured in multiple-input multiple-output mode and the UE indicates requiring a longer HARQ processing time, determining boundary information of an HS-DPCCH subframe that is closest in time to 1280+|$T_{TX\_diff,B}$−$T_{TX\_diff,A}$| chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DP-CCH CFN_DRX.

Optionally, the acquiring the boundary information of the HS-DPCCH according to the boundary information of the HS-SCCH includes:

determining boundary information of an HS-DPCCH subframe that is closest in time to 1280+$T_{TX\_diff,A}$−$T_{TX\_diff,B}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

In this embodiment, an implementation principle and a technical effect are similar to those in Embodiment 1 of the method, which are not described repeatedly in this embodiment.

Figure 7:
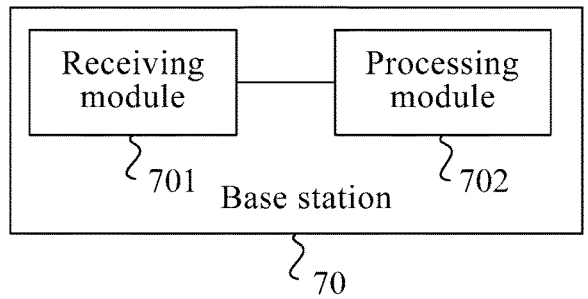
FIG. 7 is a schematic structural diagram of Embodiment 1 of a base station according to the present invention.

FIG. 7 is a schematic structural diagram of Embodiment 1 of a base station according to the present invention. As shown in FIG. 7, the base station 70 in this embodiment includes a receiving module 701 and a processing module 702, where the receiving module 701 is configured to receive cell timing information delivered by a network, where the cell timing information includes a non-time reference parameter, and the non-time reference parameter corresponds to a smallest timing difference between a downlink F-DPCH frame of time reference cell and an HS-PDSCH subframe of time reference cell; and the processing module 702 is configured to calculate boundary information HS-SCCH CFN_DRX n of a high speed shared control channel (HS-SCCH) according to the non-time reference parameter, where the processing module 702 is further configured to acquire boundary information of a high speed dedicated physical control channel (HS-DPCCH) according to the boundary information of the HS-SCCH.

Optionally, the processing module 702 is further configured to:
  align a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets −3840chips≤τ$_{DRX}$−T$_0$−7680*DRX_OFFSET<3840 chips, and T$_0$ is 1024 chips, where
  CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where
  where DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

T$_{TX\_diff2}$ is equal to a smallest timing difference between a downlink F-DPCH frame of non-time reference cell and an HS-PDSCH subframe of non-time reference cell; and
  T$_{TX\_diff1}$ is equal to the Non-time Reference.

Optionally, the processing module 702 is further configured to:
  align a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets −3840chips≤τ$_{DRX}$−T$_0$−7680*DRX_OFFSET <3840 chips, and T$_0$ is 1024 chips, where
  CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where
  DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

T$_{TX\_diff1}$ is equal to the Non-time Reference; and
  if T$_{TX\_diff3}$ is less than 7680×1.5, less than 7680×2, or less than 7680×2.5, T$_{TX\_diff2}$ is equal to T$_{TX\_diff3}$; and if T$_{TX\_diff3}$ is greater than or equal to 7680×1.5, greater than or equal to 7680×2, or greater than or equal to 7680×2.5, T$_{TX\_diff2}$ is equal to T$_{TX\_diff3}$−38400, where
  T$_{TX\_diff3}$ is equal to a timing difference between a downlink F-DPCH frame of non-time reference cell and an HS-PDSCH subframe of non-time reference cell, and a hybrid automatic retransmission request acknowledgement (HARQ-ACK) field corresponding to the HS-PDSCH subframe corresponding to T$_{TX\_diff3}$ and a hybrid automatic retransmission request acknowledgement (HARQ-ACK) field corresponding to the HS-PDSCH subframe corresponding to the Non-time Reference are in a same HS-DPCCH subframe.

Optionally, the processing module 702 is further configured to:
  align a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets −3840chips≤τ$_{DRX}$−T$_0$−7680*DRX_OFFSET <3840 chips, and T$_0$ is 1024 chips, where
  CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where
  DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

and
  if T$_{TX\_diff3}$ is less than 7680×1.5, less than 7680×2, or less than 7680×2.5, T$_{TX\_diff2}$ is equal to T$_{TX\_diff3}$, and T$_{TX\_diff1}$ is equal to the Non-time Reference; and if T$_{TX\_diff3}$ is greater than or equal to 7680×1.5, greater than or equal to 7680×2, or greater than or equal to 7680×2.5, T$_{TX\_diff2}$ is equal to a smallest timing difference between a downlink F-DPCH frame of non-time reference cell and an HS-PDSCH subframe of non-time reference cell, and T$_{TX\_diff1}$ is equal to the Non-time Reference plus 7680, where
  T$_{TX\_diff3}$ is a timing difference between the downlink F-DPCH frame of non-time reference cell and the HS-PDSCH subframe of non-time reference cell, and a hybrid automatic retransmission request acknowledgement (HARQ-ACK) field corresponding to the HS-PDSCH subframe corresponding to T$_{TX\_diff3}$ and a hybrid automatic retransmission request acknowledgement (HARQ-ACK) field corresponding to the HS-PDSCH subframe corresponding to the Non-time Reference are in a same HS-DPCCH subframe.

Optionally, the processing module 702 is further configured to:
  when a UE is not configured in multiple-input multiple-output mode, or when the UE is configured in multiple-input multiple-output mode and the UE indicates not requiring a longer HARQ processing time, determine boundary information of an HS-DPCCH subframe that is closest in time to 1280-|T$_{TX\_diff2}$-T$_{TX\_diff1}$| chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the processing module 702 is further configured to:

when a UE is configured in multiple-input multiple-output mode and the UE indicates requiring a longer HARQ processing time, determine boundary information of an HS-DPCCH subframe that is closest in time to 1280+|T$_{TX\_diff2}$-T$_{TX\_diff1}$| chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the processing module 702 is further configured to:

determine boundary information of an HS-DPCCH subframe that is closest in time to 1280+T$_{TX\_diff1}$-T$_{TX\_diff2}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

The base station according to this embodiment may be used to implement a technical solution of the method embodiment shown in FIG. 1; implementation principles and technical effects thereof are similar, and details are not described repeatedly in this embodiment.

Figure 8:
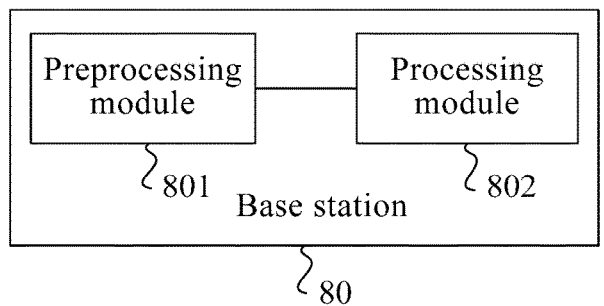
FIG. 8 is a schematic structural diagram of Embodiment 2 of a base station according to the present invention.

FIG. 8 is a schematic structural diagram of Embodiment 2 of a base station according to the present invention. As shown in FIG. 8, the base station 80 in this embodiment includes a preprocessing module 801 and a processing module 802, where the preprocessing module 801 is configured to calculate boundary information HS-SCCH CFN_DRX n of a high speed shared control channel (HS-SCCH) according to a timing difference T$_{TX\_diff}$ between a downlink F-DPCH frame of non-time reference cell and an HS-PDSCH subframe of non-time reference cell and a timing difference τ$_{DIFF}$ between an HS-PDSCH subframe of time reference cell and the HS-PDSCH subframe of non-time reference cell; and the processing module 802 is configured to acquire boundary information of a high speed dedicated physical control channel (HS-DPCCH) according to the boundary information of the HS-SCCH.

Optionally, the preprocessing module 801 is further configured to:

align a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets 3840chips≤τ$_{DRX}$-T$_0$-7680*DRX_OFFSET <3840 chips, and T$_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where when a user equipment (UE) is not configured in multiple-input multiple-output mode, or when the UE is configured in multiple-input multiple-output mode and the UE indicates not requiring a longer HARQ processing time, DRX_OFFSET is $$\left\lfloor \frac{\frac{T_{TX\_diff}}{2560}-0.9}{3} \right\rfloor - \left\lfloor \frac{\frac{T_{TX\_diff}-\tau_{DIFF}}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}-\lfloor\frac{\tau_{DIFF}}{256}\rfloor\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}-\lceil\frac{\tau_{DIFF}}{256}\rceil\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}-\text{round}(\frac{\tau_{DIFF}}{256})\times 256}{2560}-0.9}{3} \right\rfloor,$$

$$\left\lfloor \frac{\frac{T_{TX\_diff}}{2560}-0.9}{3} \right\rfloor - \left\lfloor \frac{\lfloor T_{TX\_diff}-\frac{\tau_{DIFF}}{256}\rfloor\times 256}{\frac{2560}{3}}-0.9 \right\rfloor, \text{ or}$$

$$\left\lfloor \frac{\frac{T_{TX\_diff}}{2560}-0.9}{3} \right\rfloor - \left\lfloor \frac{\lceil T_{TX\_diff}-\frac{\tau_{DIFF}}{256}\rceil\times 256}{\frac{2560}{3}}-0.9 \right\rfloor;$$

or when a user equipment (UE) is configured in multiple-input multiple-output mode and the UE indicates requiring a longer HARQ processing time, DRX_OFFSET is $$\left\lfloor \frac{\frac{T_{TX\_diff}}{2560}-0.9}{3} \right\rfloor - \left\lfloor \frac{\frac{T_{TX\_diff}+\tau_{DIFF}}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}+\lfloor\frac{\tau_{DIFF}}{256}\rfloor\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}+\lceil\frac{\tau_{DIFF}}{256}\rceil\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}+\text{round}(\frac{\tau_{DIFF}}{256})\times 256}{2560}-0.9}{3} \right\rfloor,$$

$$\left\lfloor \frac{\frac{T_{TX\_diff}}{2560}-0.9}{3} \right\rfloor - \left\lfloor \frac{\lfloor T_{TX\_diff}+\frac{\tau_{DIFF}}{256}\rfloor\times 256}{\frac{2560}{3}}-0.9 \right\rfloor,$$

$$\left\lfloor \frac{\frac{T_{TX\_diff}}{2560}-0.9}{3} \right\rfloor - \left\lfloor \frac{\lceil T_{TX\_diff}+\frac{\tau_{DIFF}}{256}\rceil\times 256}{\frac{2560}{3}}-0.9 \right\rfloor.$$

Optionally, the processing module 802 is further configured to:

when the UE is not configured in multiple-input multiple-output mode, or when the UE is configured in multiple-input multiple-output mode and the UE indicates not requiring a longer HARQ processing time, determine boundary information of an HS-DPCCH subframe that is closest in time to 1280-$\tau_{DIFF}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the processing module 802 is further configured to:

when the UE is configured in multiple-input multiple-output mode and the UE indicates requiring a longer HARQ processing time, determine boundary information of an HS-DPCCH subframe that is closest in time to 1280+$\tau_{DIFF}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the preprocessing module 801 is configured to calculate boundary information HS-SCCH CFN_DRX n of a high speed shared control channel (HS-SCCH) according to a timing difference $T_{TX\_diff,B}$ between a downlink F-DPCH frame of non-time reference cell and an HS-PDSCH subframe of non-time reference cell and a timing difference $T_{TX\_diff,A}$ between a downlink F-DPCH frame of time reference cell and an HS-PDSCH subframe of time reference cell; and the processing module 802 is configured to acquire boundary information of a high speed dedicated physical control channel (HS-DPCCH) according to the boundary information of the HS-SCCH.

Optionally, the preprocessing module 801 is further configured to:

align a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets −3840chips≤$\tau_{DRX}$−$T_0$−7680*DRX_OFFSET <3840 chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where
DRX_OFFSET is $$\left\lfloor \frac{\frac{T_{TX\_diff,B}}{2560} - 0.9}{3} \right\rfloor - \left\lfloor \frac{\frac{T_{TX\_diff,A}}{2560} - 0.9}{3} \right\rfloor;$$

a hybrid automatic retransmission request acknowledgement (HARQ-ACK) field corresponding to the HS-PDSCH subframe corresponding to $T_{TX\_diff,B}$ and a hybrid automatic retransmission request acknowledgement (HARQ-ACK) field corresponding to the HS-PDSCH subframe corresponding to $T_{TX\_diff,A}$ are in a same HS-DPCCH subframe; and |$T_{TX\_diff,B}$−$T_{TX\_diff,A}$|<7680 or |$T_{TX\_diff,B}$−$T_{TX\_diff,A}$|≤3840.

Optionally, the processing module 802 is further configured to:

when a user equipment (UE) is not configured in multiple-input multiple-output mode, or when the UE is configured in multiple-input multiple-output mode and the UE indicates not requiring a longer HARQ processing time, determine boundary information of an HS-DPCCH subframe that is closest in time to 1280-|$T_{TX\_diff,B}$−$T_{TX\_diff,A}$| chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the processing module 802 is further configured to:

when a user equipment (UE) is configured in multiple-input multiple-output mode and the UE indicates requiring a longer HARQ processing time, determine boundary information of an HS-DPCCH subframe that is closest in time to 1280+|$T_{TX\_diff,B}$−$T_{TX\_diff,A}$| chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the processing module 802 is further configured to:

determine boundary information of an HS-DPCCH subframe that is closest in time to 1280+$T_{TX\_diff,A}$−$T_{TX\_diff,B}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

The base station according to this embodiment may be used to implement a technical solution of the method embodiment shown in FIG. 2 or FIG. 3; implementation principles and technical effects thereof are similar, and details are not described repeatedly in this embodiment.

Figure 9:
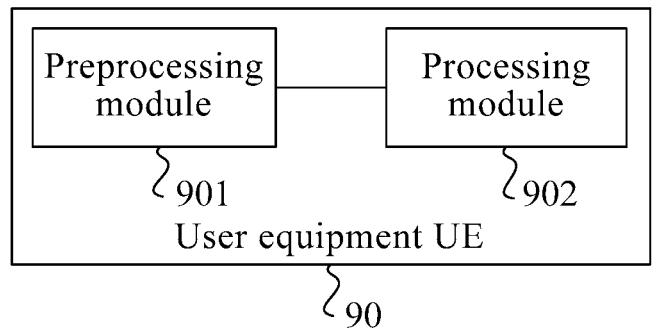
FIG. 9 is a schematic structural diagram of Embodiment 1 of a user equipment (UE) according to the present invention.

FIG. 9 is a schematic structural diagram of Embodiment 1 of a user equipment (UE) according to the present invention. As shown in FIG. 9, the UE 90 in this embodiment includes a preprocessing module 901 and a processing module 902, where the preprocessing module 901 is configured to calculate boundary information HS-SCCH CFN_DRX n of a high speed shared control channel (HS-SCCH) according to a smallest timing difference between a downlink F-DPCH frame of time reference cell and an HS-PDSCH subframe of time reference cell; and the processing module 902 is configured to acquire boundary information of a high speed dedicated physical control channel (HS-DPCCH) according to the boundary information of the HS-SCCH.

Optionally, the preprocessing module 901 is further configured to:

align a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets $-3840 \text{chips} \leq \tau_{DRX} - T_0 - 7680*\text{DRX\_OFFSET} < 3840$ chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

$T_{TX\_diff2}$ is equal to a smallest timing difference between a downlink F-DPCH frame of non-time reference cell and an HS-PDSCH subframe of non-time reference cell; and $T_{TX\_diff1}$ is equal to the smallest timing difference between the downlink F-DPCH frame of time reference cell and the HS-PDSCH subframe of time reference cell.

Optionally, the preprocessing module 901 is further configured to:

align a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets $-3840 \text{chips} \leq \tau_{DRX} - T_0 - 7680*\text{DRX\_OFFSET} < 3840$ chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

$T_{TX\_diff1}$ is equal to the smallest timing difference between the downlink F-DPCH frame of time reference cell and the HS-PDSCH subframe of time reference cell; and if $T_{TX\_diff3}$ is less than 7680×1.5, less than 7680×2, or less than 7680×2.5, $T_{TX\_diff2}$ is equal to $T_{TX\_diff3}$; and if $T_{TX\_diff3}$ is greater than or equal to 7680×1.5, greater than or equal to 7680×2, or greater than or equal to 7680×2.5, $T_{TX\_diff2}$ is equal to $T_{TX\_diff3}-38400$, where $T_{TX\_diff3}$ is a timing difference between a downlink F-DPCH frame of non-time reference cell and an HS-PDSCH subframe of non-time reference cell, and a hybrid automatic retransmission request acknowledgement (HARQ-ACK) field corresponding to the HS-PDSCH subframe corresponding to $T_{TX\_diff3}$ and a hybrid automatic retransmission request acknowledgement (HARQ-ACK) field corresponding to the HS-PDSCH subframe corresponding to $T_{TX\_diff1}$ are in a same HS-DPCCH subframe.

Optionally, the preprocessing module 901 is further configured to:

align a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets $-3840 \text{chips} \leq \tau_{DRX} - T_0 - 7680*\text{DRX\_OFFSET} < 3840$ chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

and if $T_{TX\_diff3}$ is less than 7680×1.5, less than 7680×2, or less than 7680×2.5, $T_{TX\_diff2}$ is equal to $T_{TX\_diff3}$, and $T_{TX\_diff1}$ is equal to the smallest timing difference between the downlink F-DPCH frame of time reference cell and the HS-PDSCH subframe of time reference cell; and if $T_{TX\_diff3}$ is greater than or equal to 7680×1.5, greater than or equal to 7680×2, or greater than or equal to 7680×2.5, $T_{TX\_diff2}$ is equal to a smallest timing difference between a downlink F-DPCH frame of non-time reference cell and an HS-PDSCH subframe of non-time reference cell, and $T_{TX\_diff1}$ is equal to 7680 plus the smallest timing difference between the downlink F-DPCH frame of time reference cell and the HS-PDSCH subframe of time reference cell, where $T_{TX\_diff3}$ is a timing difference between the downlink F-DPCH frame of non-time reference cell and the HS-PDSCH subframe of non-time reference cell, and a hybrid automatic retransmission request acknowledgement (HARQ-ACK) field corresponding to the HS-PDSCH subframe corresponding to $T_{TX\_diff3}$ and a hybrid automatic retransmission request acknowledgement (HARQ-ACK) field corresponding to the HS-PDSCH subframe corresponding to the smallest timing difference between the downlink F-DPCH frame of time reference cell and the HS-PDSCH subframe of time reference cell are in a same HS-DPCCH subframe.

Optionally, the processing module 902 is further configured to:

when the UE is not configured in multiple-input multiple-output mode, or when the UE is configured in multiple-input multiple-output mode and the UE indicates not requiring a longer HARQ processing time, determine boundary information of an HS-DPCCH subframe that is closest in time to $1280-|T_{TX\_diff2}-T_{TX\_diff1}|$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the processing module 902 is further configured to:

when the UE is configured in multiple-input multiple-output mode and the UE indicates requiring a longer HARQ processing time, determine boundary information of an HS-DPCCH subframe that is closest in time to 1280+|$T_{TX\_diff2}-T_{TX\_diff1}$| chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the processing module 902 is further configured to:

determine boundary information of an HS-DPCCH subframe that is closest in time to 1280+$T_{TX\_diff1}-T_{TX\_diff2}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the preprocessing module 901 is configured to calculate boundary information HS-SCCH CFN_DRX n of a high speed shared control channel (HS-SCCH) according to a timing difference $T_{TX\_diff}$ between a downlink F-DPCH frame of non-time reference cell and an HS-PDSCH subframe of non-time reference cell and a timing difference $\tau_{DIFF}$ between a matching HS-PDSCH subframe of time reference cell and the HS-PDSCH subframe of non-time reference cell; and the processing module 902 is configured to acquire boundary information of a high speed dedicated physical control channel (HS-DPCCH) according to the boundary information of the HS-SCCH.

Optionally, the preprocessing module 901 is further configured to:

align a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets −3840chips≤$\tau_{DRX}$−$T_0$−7680*DRX_OFFSET <3840 chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where when the UE is not configured in multiple-input multiple-output mode, or when the UE is configured in multiple-input multiple-output mode and the UE indicates not requiring a longer HARQ processing time, DRX_OFFSET is $$\left\lfloor \frac{\frac{T_{TX\_diff}}{2560}-0.9}{3} \right\rfloor - \left\lfloor \left| \frac{\frac{T_{TX\_diff}-\tau_{DIFF}}{2560}-0.9}{3} \right| \right\rfloor,$$

$$\left\lfloor \frac{\frac{T_{TX\_diff}}{2560}-0.9}{3} \right\rfloor - \left\lfloor \frac{\frac{T_{TX\_diff}-\lfloor\frac{\tau_{DIFF}}{256}\rfloor\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}-\lceil\frac{\tau_{DIFF}}{256}\rceil\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}-\text{round}(\frac{\tau_{DIFF}}{256})\times 256}{2560}-0.9}{3} \right\rfloor,$$

$$\left\lfloor \frac{\frac{T_{TX\_diff}}{2560}-0.9}{3} \right\rfloor - \left\lfloor \frac{\lfloor T_{TX\_diff}-\frac{\tau_{DIFF}}{256}\rfloor\times 256}{2560}-0.9}{3} \right\rfloor, \text{ or}$$

$$\left\lfloor \frac{\frac{T_{TX\_diff}}{2560}-0.9}{3} \right\rfloor - \left\lfloor \frac{\lceil T_{TX\_diff}-\frac{\tau_{DIFF}}{256}\rceil\times 256}{2560}-0.9}{3} \right\rfloor;$$

or when the UE is configured in multiple-input multiple-output mode and the UE indicates requiring a longer HARQ processing time, DRX_OFFSET is $$\left\lfloor \frac{\frac{T_{TX\_diff}}{2560}-0.9}{3} \right\rfloor - \left\lfloor \left| \frac{\frac{T_{TX\_diff}+\tau_{DIFF}}{2560}-0.9}{3} \right| \right\rfloor,$$

$$\left\lfloor \frac{\frac{T_{TX\_diff}}{2560}-0.9}{3} \right\rfloor - \left\lfloor \frac{\frac{T_{TX\_diff}+\lfloor\frac{\tau_{DIFF}}{256}\rfloor\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}+\lceil\frac{\tau_{DIFF}}{256}\rceil\times 256}{2560}-0.9}{3} \right\rfloor,$$

$$\left\lfloor \frac{\frac{T_{TX\_diff}}{2560}-0.9}{3} \right\rfloor - \left\lfloor \frac{\frac{T_{TX\_diff}+\text{round}(\frac{\tau_{DIFF}}{256})\times 256}{2560}-0.9}{3} \right\rfloor,$$

$$\left\lfloor \frac{\frac{T_{TX\_diff}}{2560}-0.9}{3} \right\rfloor - \left\lfloor \frac{\lfloor T_{TX\_diff}+\frac{\tau_{DIFF}}{256}\rfloor\times 256}{2560}-0.9}{3} \right\rfloor, \text{ or}$$

$$\left\lfloor \frac{\frac{T_{TX\_diff}}{2560}-0.9}{3} \right\rfloor - \left\lfloor \frac{\lceil T_{TX\_diff}+\frac{\tau_{DIFF}}{256}\rceil\times 256}{2560}-0.9}{3} \right\rfloor.$$

Optionally, the processing module 902 is further configured to:

when the UE is not configured in multiple-input multiple-output mode, or when the UE is configured in multiple-input multiple-output mode and the UE indicates not requiring a longer HARQ processing time, determine boundary information of an HS-DPCCH subframe that is closest in time to 1280−$\tau_{DIFF}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the processing module 902 is further configured to:

when the UE is configured in multiple-input multiple-output mode and the UE indicates requiring a longer HARQ processing time, determine boundary information of an HS-DPCCH subframe that is closest in time to 1280+$\tau_{DIFF}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the preprocessing module 901 is configured to calculate boundary information HS-SCCH CFN_DRX n of a high speed shared control channel (HS-SCCH) according to a timing difference $T_{TX\_diff,B}$ between a downlink F-DPCH frame of non-time reference cell and an HS-PDSCH subframe of non-time reference cell and a timing difference $T_{TX\_diff,A}$ between a downlink F-DPCH frame of time reference cell and an HS-PDSCH subframe of time reference cell; and the processing module 902 is configured to acquire boundary information of a high speed dedicated physical control channel (HS-DPCCH) according to the boundary information of the HS-SCCH.

Optionally, the preprocessing module 901 is further configured to:

align a start time of HS-SCCH CFN_DRX n with a start time of an HS-SCCH subframe, where the HS-SCCH subframe is an HS-SCCH subframe behind τDRX chips in a start time of F-DPCH CFN n, τDRX meets −3840chips≤$\tau_{DRX}$−$T_0$−7680*DRX_OFFSET <3840 chips, and $T_0$ is 1024 chips, where CFN_DRX is a connection frame number in a discontinuous reception (DRX) state, and n in CFN_DRX n is a serial number of CFN_DRX; F-DPCH CFN is a connection frame number of an F-DPCH, and n in CFN n is a serial number of CFN; DRX_OFFSET is an offset of discontinuous reception (DRX); and τDRX is a timing difference between HS-SCCH CFN_DRX n and F-DPCH CFN n, where DRX_OFFSET is $$\left| \left\lfloor \frac{T_{TX\_diff,B}}{2560} - 0.9 \right\rfloor - \left\lfloor \frac{T_{TX\_diff,A}}{2560} - 0.9 \right\rfloor \right|;$$

a hybrid automatic retransmission request acknowledgement (HARQ-ACK) field corresponding to the HS-PDSCH subframe corresponding to $T_{TX\_diff,B}$ and a hybrid automatic retransmission request acknowledgement (HARQ-ACK) field corresponding to the HS-PDSCH subframe corresponding to $T_{TX\_diff,A}$ are in a same HS-DPCCH subframe; and |$T_{TX\_diff,B}$−$T_{TX\_diff,A}$|<7680 or |$T_{TX\_diff,B}$−$T_{TX\_diff,A}$|≤3840.

Optionally, the processing module 902 is further configured to:

when the UE is not configured in multiple-input multiple-output mode, or when the UE is configured in multiple-input multiple-output mode and the UE indicates not requiring a longer HARQ processing time, determine boundary information of an HS-DPCCH subframe that is closest in time to 1280−|$T_{TX\_diff,B}$−$T_{TX\_diff,A}$| chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the processing module 902 is further configured to:

when the UE is configured in multiple-input multiple-output mode and the UE indicates requiring a longer HARQ processing time, determine boundary information of an HS-DPCCH subframe that is closest in time to 1280+|$T_{TX\_diff,B}$−$T_{TX\_diff,A}$| chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

Optionally, the processing module 902 is further configured to:

determine boundary information of an HS-DPCCH subframe that is closest in time to 1280+$T_{TX\_diff,A}$−$T_{TX\_diff,B}$ chips after the start time of the boundary information of the HS-SCCH, that is, HS-SCCH CFN_DRX n, as the boundary information of the HS-DPCCH, that is, HS-DPCCH CFN_DRX n, where n in HS-SCCH CFN_DRX n is a serial number of HS-SCCH CFN_DRX, and n in HS-DPCCH CFN_DRX n is a serial number of HS-DPCCH CFN_DRX.

The UE according to the embodiment may be used to implement technical solutions of the method embodiments shown in FIG. 4 to FIG. 6; implementation principles and technical effects thereof are similar, and details are not described repeatedly in this embodiment.

Figure 10:
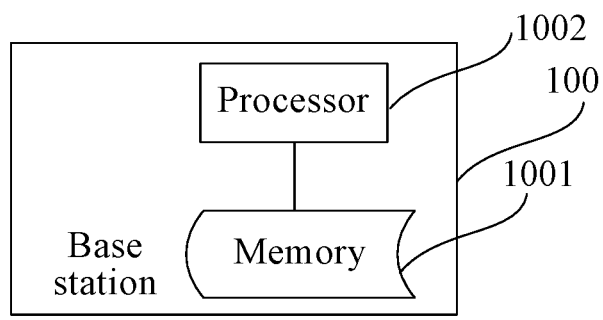
FIG. 10 is a schematic structural diagram of Embodiment 3 of a base station according to the present invention.

FIG. 10 is a schematic structural diagram of Embodiment 3 of a base station according to the present invention. As shown in FIG. 10, the base station 100 provided in this embodiment includes a memory 1001 and a processor 1002, where the memory 1001 is connected to the processor 1002.

The memory 1001 stores an execution instruction; when the base station 100 runs, the processor 1002 communicates with the memory 1001, and the processor 1002 invokes the execution instruction in the memory 1001 to execute technical solutions in the method embodiments shown in FIG. 1 to FIG. 3. Implementation principles and technical effects thereof are similar, and details are not described repeatedly in this embodiment.

Figure 11:
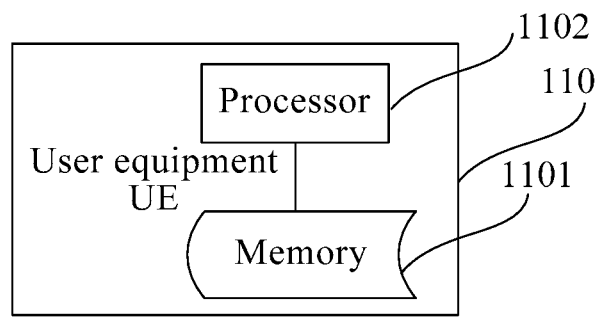
FIG. 11 is a schematic structural diagram of Embodiment 2 of a user equipment (UE) according to the present invention.

FIG. 11 is a schematic structural diagram of Embodiment 2 of a user equipment (UE) according to the present invention. As shown in FIG. 11, the UE 110 provided in this embodiment includes a memory 1101 and a processor 1102, where the memory 1101 is connected to the processor 1102. The memory 1101 stores an execution instruction; when the UE 110 runs, the processor 1102 communicates with the memory 1101, and the processor 1102 invokes the execution instruction in the memory 1101 to execute technical solutions in the method embodiments shown in FIG. 4 to FIG. 6. Implementation principles and technical effects thereof are similar, and details are not described repeatedly in this embodiment.

In the several embodiments provided in the present application, it should be understood that the disclosed device and method may be implemented in other manners. For example, the described device embodiment is merely exemplary. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network units. Some or all of the modules may be selected according to actual needs to achieve the objectives of the solutions of the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A channel boundary locating method, comprising:
receiving, by a base station of a non-time reference cell, cell timing information delivered by a network, wherein the cell timing information comprises a non-time reference parameter, and the non-time reference parameter corresponds to a smallest timing difference between a downlink Fractional Dedicated Physical Channel (F-DPCH) frame of a time reference cell and an High Speed Physical Dedicated Shared Channel (HS-PDSCH) subframe of the time reference cell;
calculating, by the base station of the non-time reference cell, boundary information, n of High Speed Share Control Channel Connection Frame Number Discontinuous Reception (HS-SCCH CFN_DRX), of a HS-SCCH according to the non-time reference parameter, wherein n is a serial number of the HS-SCCH CFN DRX; and
acquiring, by the base station of the non-time reference cell, boundary information of a high speed dedicated physical control channel (HS-DPCCH) according to the boundary information of the HS-SCCH.

2. The method according to claim 1, wherein the calculating the boundary information, the n of HS-SCCH CFN_DRX of the HS-SCCH according to the non-time reference parameter further comprises:
aligning a start time of the n of HS-SCCH CFN_DRX with a start time of an HS-SCCH subframe, wherein the HS-SCCH subframe is an HS-SCCH subframe behind $\tau_{DRX}$ chips in a start time of n of F-DPCH CFN, $\tau_{DRX\ meets}$ $-3840 chips \le \tau_{DRX} - T_0 - 7680 * DRX\_OFFSET < 3840$ chips, and $T_0$ is 1024 chips, wherein
CFN_DRX is a connection frame number in a DRX state, and n of CFN_DRX is the serial number of the CFN_DRX; F-DPCH CFN is a connection frame number of an F-DPCH, and n of CFN is a serial number of the CFN; DRX_OFFSET is an offset of a DRX; and $\tau_{DRX}$ is a timing difference between the n of HS-SCCH CFN_DRX and the n of F-DPCH CFN, wherein
DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

$T_{TX\_diff1}$ is equal to the Non-time Reference; and
if $T_{TX\_diff3}$ is less than $7680 \times 1.5$, $T_{TX\_diff2}$ is equal to $T_{TX\_diff3}$; and if $T_{TX\_diff3}$ is greater than or equal to $7680 \times 2.5$, $T_{TX\_diff2}$ is equal to $T_{TX\_diff3} - 38400$, wherein
$T_{TX\_diff3}$ is equal to a timing difference between a downlink F-DPCH frame of the non-time reference cell and an HS-PDSCH subframe of the non-time reference cell, and a hybrid automatic retransmission request acknowledgement (HARQ-ACK) field corresponding to the HS-PDSCH subframe corresponding to $T_{TX\_diff3}$ and a HARQ-ACK field corresponding to the HS-PDSCH subframe corresponding to the Non-time Reference are in a same HS-DPCCH subframe.

3. The method according to claim 2, wherein the acquiring the boundary information of the HS-DPCCH according to the boundary information of the HS-SCCH further comprises:
determining boundary information of an HS-DPCCH subframe that is closest in time to $1280 + T_{TX\_diff1} - T_{TX\_diff2}$ chips after the start time of the boundary information of the HS-SCCH, that is, the n of HS-SCCH CFN_DRX, as the boundary information of the HS-DPCCH, that is, n of HS-DPCCH CFN_DRX n, wherein the n of HS-DPCCH CFN_DRX is a serial number of the HS-DPCCH CFN_DRX.

4. A base station, comprising a memory and a processor, wherein the memory is connected to the processor; and
the memory stores an execution instruction; and when the base station runs, the processor communicates with the memory, and the processor executes the execution instruction, so that the base station executes the method according to claim 1.

5. A channel boundary locating method, comprising:
calculating, by a user equipment (UE), boundary information, n of High Speed Share Control Channel Connection Frame Number Discontinuous Reception (HS-SCCH CFN_DRX), of a HS-SCCH according to a smallest timing difference between a downlink Fractional Dedicated Physical Channel (F-DPCH) frame of a time reference cell and an High Speed Physical Dedicated Shared Channel (HS-PDSCH) subframe of the time reference cell, wherein n is a serial number of the HS-SCCH CFN_DRX; and
acquiring, by the UE, boundary information of a high speed dedicated physical control channel (HS-DPCCH) according to the boundary information of the HS-SCCH.

6. The method according to claim 5, wherein the calculating the boundary information, the n of HS-SCCH CFN_DRX of the HS-SCCH according to the smallest timing difference between the downlink F-DPCH frame of the time reference cell and the HS-PDSCH subframe of the time reference cell comprises:

aligning a start time of the n of HS-SCCH CFN_DRX with a start time of an HS-SCCH subframe, wherein the HS-SCCH subframe is an HS-SCCH subframe behind $\tau_{DRX}$ chips in a start time of n of F-DPCH CFN, $\tau_{DRX}$ meets $-3840$ chips$\leq\tau_{DRX}-T_0-7680*DRX\_OFFSET<3840$ chips, and $T_0$ is 1024 chips, wherein CFN_DRX is a connection frame number in a DRX state, and n of CFN_DRX is a serial number of CFN_DRX; F-DPCH CFN is a connection frame number of an F-DPCH, and n of CFN is a serial number of CFN; DRX_OFFSET is an offset of DRX; and $\tau_{DRX}$ is a timing difference between the n of HS-SCCH CFN_DRX and the n of F-DPCH CFN, wherein DRX_OFFSET is $$\left\lfloor \frac{\frac{T_{TX\_diff2}}{2560}-0.9}{3}\right\rfloor - \left\lfloor \frac{\frac{T_{TX\_diff1}}{2560}-0.9}{3}\right\rfloor;$$

$T_{TX\_diff1}$ is equal to the smallest timing difference between the downlink F-DPCH frame of time reference cell and the HS-PDSCH subframe of the time reference cell; and if $T_{TX\_diff3}$ is less than 7680×1.5, $T_{TX\_diff2}$ is equal to $T_{TX\_diff3}$; and if $T_{TX\_diff3}$ is greater than or equal to 7680×2.5, $T_{TX\_diff2}$ is equal to $T_{TX\_diff3}-38400$, wherein $T_{TX\_diff3}$ is a timing difference between a downlink F-DPCH frame of a non-time reference cell and an HS-PDSCH subframe of the non-time reference cell, and a hybrid automatic retransmission request acknowledgement HARQ-ACK field corresponding to the HS-PDSCH subframe corresponding to $T_{TX\_diff3}$ and an HARQ-ACK field corresponding to the HS-PDSCH subframe corresponding to $T_{TX\_diff1}$ are in a same HS-DPCCH subframe.

7. The method according to claim 6, wherein the acquiring the boundary information of the HS-DPCCH according to the boundary information of the HS-SCCH comprises:

determining boundary information of an HS-DPCCH subframe that is closest in time to $1280+T_{TX\_diff1}-T_{TX\_diff2}$ chips after the start time of the boundary information of the HS-SCCH, that is, the n of HS-SCCH CFN_DRX as the boundary information of the HS-DPCCH, that is, n of HS-DPCCH CFN_DRX, wherein the n of HS-DPCCH CFN_DRX is a serial number of the HS-DPCCH CFN_DRX.

8. A user equipment (UE), comprising a memory and a processor, wherein the memory is connected to the processor; and the memory stores an execution instruction; and when the UE runs, the processor communicates with the memory, and the processor executes the execution instruction, so that the UE executes the method according to claim 5.

9. A base station, comprising:

a receiver, configured to receive cell timing information delivered by a network, wherein the cell timing information comprises a non-time reference parameter, and the non-time reference parameter corresponds to a smallest timing difference between a downlink Fractional Dedicated Physical Channel (F-DPCH) frame of a time reference cell and an High Speed Physical Dedicated Shared Channel (HS-PDSCH) subframe of the time reference cell; and a processor, configured to calculate boundary information, n of High Speed Share Control Channel Connection Frame Number Discontinuous Reception (HS-SCCH CFN_DRX), of a HS-SCCH according to the non-time reference parameter, wherein n is a serial number of the HS-SCCH CFN DRX;

wherein the processor is further configured to acquire boundary information of a high speed dedicated physical control channel (HS-DPCCH) according to the boundary information of the HS-SCCH.

10. The base station according to claim 9, wherein the processor is further configured to:

align a start time of the n of HS-SCCH CFN_DRX with a start time of an HS-SCCH subframe, wherein the HS-SCCH subframe is an HS-SCCH subframe behind $\tau_{DRX}$ chips in a start time of n of F-DPCH CFN, $\tau_{DRX}$ meets $-3840$ chips$\leq\tau_{DRX}-T_0-7680*DRX\_OFFSET<3840$ chips, and $T_0$ is 1024 chips, wherein CFN_DRX is a connection frame number in a DRX state, and n of CFN_DRX is a serial number of the CFN_DRX; F-DPCH CFN is a connection frame number of an F-DPCH, and n of CFN is a serial number of the CFN; DRX_OFFSET is an offset of DRX; and $\tau_{DRX}$ is a timing difference between the n of HS-SCCH CFN_DRX and the n of F-DPCH CFN, wherein DRX_OFFSET is $$\left\lfloor \frac{\frac{T_{TX\_diff2}}{2560}-0.9}{3}\right\rfloor - \left\lfloor \frac{\frac{T_{TX\_diff1}}{2560}-0.9}{3}\right\rfloor;$$

$T_{TX\_diff1}$ is equal to the Non-time Reference; and if $T_{TX\_diff1}$ is less than 7680×1.5, $T_{TX\_diff2}$ is equal to $T_{TX\_diff3}$; and if $T_{TX\_diff3}$ is greater than or equal to 7680×2.5, $T_{TX\_diff2}$ is equal to $T_{TX\_diff3}-38400$, wherein $T_{TX\_diff3}$ is equal to a timing difference between a downlink F-DPCH frame of a non-time reference cell and an HS-PDSCH subframe of the non-time reference cell, and a hybrid automatic retransmission request acknowledgement (HARQ-ACK) field corresponding to the HS-PDSCH subframe corresponding to $T_{TX\_diff3}$ and a HARQ-ACK field corresponding to the HS-PDSCH subframe corresponding to the Non-time Reference are in a same HS-DPCCH subframe.

11. The base station according to claim 10, wherein the processor is further configured to:

determine boundary information of an HS-DPCCH subframe that is closest in time to $1280+T_{TX\_diff1}-T_{TX\_diff2}$ chips after the start time of the boundary information of the HS-SCCH, that is, the n of HS-SCCH CFN_DRX, as the boundary information of the HS-DPCCH, that is, n of HS-DPCCH CFN_DRX, wherein the n of HS-DPCCH CFN_DRX is a serial number of the HS-DPCCH CFN_DRX.

12. A user equipment (UE), comprising:

a first processor, configured to calculate boundary information, n of High Speed Share Control Channel Connection Frame Number Discontinuous Reception (HS-SCCH CFN_DRX), of a HS-SCCH according to a smallest timing difference between a downlink Fractional Dedicated Physical Channel (F-DPCH) frame of a time reference cell and an High Speed Physical Dedicated Shared Channel (HS-PDSCH) subframe of the time reference cell, wherein n is a serial number of the HS-SCCH CFN DRX; and a second processor, configured to acquire boundary information of a high speed dedicated physical control channel (HS-DPCCH) according to the boundary information of the HS-SCCH.

13. The UE according to claim 12, wherein the first processor is further configured to:

align a start time of the n of HS-SCCH CFN_DRX with a start time of an HS-SCCH subframe, wherein the HS-SCCH subframe is an HS-SCCH subframe behind $\tau_{DRX}$ chips in a start time of n of F-DPCH CFN $\tau_{DRX}$ meets $-3840$ chips$\leq \tau_{DRX} - T_0 - 7680*$DRX_OFFSET$<3840$ chips, and $T_0$ is 1024 chips, wherein CFN_DRX is a connection frame number in a DRX state, and n of CFN_DRX is a serial number of CFN_DRX; F-DPCH CFN is a connection frame number of an F-DPCH, and n of CFN is a serial number of CFN; DRX_OFFSET is an offset of DRX; and $\tau_{DRX}$ is a timing difference between the n of HS-SCCH CFN_DRX and the n of F-DPCH CFN, wherein DRX_OFFSET is $$\left\lfloor \frac{\frac{T_{TX\_diff2}}{2560} - 0.9}{3} \right\rfloor - \left\lfloor \frac{\frac{T_{TX\_diff1}}{2560} - 0.9}{3} \right\rfloor;$$

$T_{TX\_diff1}$ is equal to the smallest timing difference between the downlink F-DPCH frame of time reference cell and the HS-PDSCH subframe of time reference cell; and if $T_{TX\_diff3}$ is less than 7680×1.5, $T_{TX\_diff2}$ is equal to $T_{TX\_diff3}$; and if $T_{TX\_diff3}$ is greater than or equal to 7680×2.5, $T_{TX\_diff2}$ is equal to $T_{TX\_diff3} - 38400$, wherein $T_{TX\_diff3}$ is a timing difference between a downlink F-DPCH frame of a non-time reference cell and an HS-PDSCH subframe of the non-time reference cell, and a hybrid automatic retransmission request acknowledgement (HARQ-ACK) field corresponding to the HS-PDSCH subframe corresponding to $T_{TX\_diff3}$ and a HARQ-ACK field corresponding to the HS-PDSCH subframe corresponding to $T_{TX\_diff1}$ are in a same HS-DPCCH subframe.

14. The UE according to claim 13, wherein the processor is further configured to:

determine boundary information of an HS-DPCCH subframe that is closest in time to $1280 + T_{TX\_diff1} - T_{TX\_diff2}$ chips after the start time of the boundary information of the HS-SCCH, that is, the n of HS-SCCH CFN_DRX, as the boundary information of the HS-DPCCH, that is, n of HS-DPCCH CFN_DRX, wherein the n of HS-DPCCH CFN_DRX is a serial number of HS-the DPCCH CFN_DRX.

* * * * *